US 7,768,983 B2

(12) United States Patent
Nylander et al.

(10) Patent No.: US 7,768,983 B2
(45) Date of Patent: Aug. 3, 2010

(54) RADIO NETWORK CONTROLLER SELECTION FOR IP-CONNECTED RADIO BASE STATION

(75) Inventors: Tomas Nylander, Värmdö (SE); Jan Vikberg, Järna (SE); Paul M. Teder, Täby (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 381 days.

(21) Appl. No.: 11/538,084

(22) Filed: Oct. 3, 2006

(65) Prior Publication Data

US 2007/0097983 A1    May 3, 2007

Related U.S. Application Data

(60) Provisional application No. 60/722,983, filed on Oct. 4, 2005, provisional application No. 60/722,984, filed on Oct. 4, 2005, provisional application No. 60/722,982, filed on Oct. 4, 2005, provisional application No. 60/723,946, filed on Oct. 6, 2005, provisional application No. 60/728,780, filed on Oct. 21, 2005, provisional application No. 60/731,495, filed on Oct. 31, 2005.

(51) Int. Cl.
| | |
|---|---|
| H04W 4/00 | (2009.01) |
| H04L 12/58 | (2006.01) |
| H04L 12/56 | (2006.01) |
| H04B 7/216 | (2006.01) |
| H04W 72/00 | (2009.01) |
| H04W 36/00 | (2009.01) |
| H04M 3/42 | (2006.01) |
| H04L 29/06 | (2006.01) |

(52) U.S. Cl. ............... 370/338; 370/395.2; 370/395.52; 370/320; 455/450; 455/452; 455/422.1; 455/439; 455/444; 455/435.2; 455/414.1; 455/414.3

(58) Field of Classification Search ................. 370/338, 370/395.2, 395.52
See application file for complete search history.

(56) References Cited

U.S. PATENT DOCUMENTS

5,295,153 A    3/1994 Gudsmundson (Continued)

FOREIGN PATENT DOCUMENTS

EP    1 209 940 A1    5/2002

(Continued)

OTHER PUBLICATIONS

Shin et al, "Packet Scheduling Over A Shared Wireless Fink For Heterogeneous Classes of Traffic", IEEE Communications Society, © 2004 IEEE, pp. 58-62.

(Continued)

*Primary Examiner*—Vincent P Harper
*Assistant Examiner*—Timothy Pham
(74) *Attorney, Agent, or Firm*—Nixon & Vanderhye, P.C.

(57) ABSTRACT

Methods and apparatus enable a femto radio base station ($28_f$) to be connected to an appropriate radio network controller node (26) of a radio access network (24) for use as an active radio network controller node for the femto radio base station. The connection is accomplished the femto radio base station ($28_f$) preparing a node address inquiry and for using the node address inquiry for obtaining an internet protocol (IP) address of an appropriate radio network controller node. The femto radio base station ($28_f$) further uses the internet protocol (IP) address of an appropriate radio network controller node for connecting to the appropriate radio network controller node as its active radio network controller node.

40 Claims, 13 Drawing Sheets

U.S. PATENT DOCUMENTS

| | | | |
|---|---|---|---|
| 5,911,120 A | 6/1999 | Jarett et al. | |
| 5,920,818 A | 7/1999 | Frodigh et al. | |
| 6,178,327 B1 | 1/2001 | Gomez | |
| 6,289,219 B1 | 9/2001 | Patronen et al. | |
| 6,289,220 B1* | 9/2001 | Spear | 455/436 |
| 6,430,414 B1 | 8/2002 | Sorokine et al. | |
| 6,532,361 B1 | 3/2003 | Kamperschroer | |
| 6,615,035 B1 | 9/2003 | Lucidarme et al. | |
| 6,816,729 B1 | 11/2004 | Halonen | |
| 6,853,627 B1 | 2/2005 | Evans | |
| 6,993,359 B1 | 1/2006 | Nrushimha et al. | |
| 7,003,297 B2 | 2/2006 | Willars et al. | |
| 7,054,638 B2 | 5/2006 | Rune et al. | |
| 7,072,656 B2 | 7/2006 | Willars et al. | |
| 7,072,663 B2 | 7/2006 | Ramos et al. | |
| 7,286,801 B2 | 10/2007 | Amerga et al. | |
| 7,366,542 B2 | 4/2008 | Schmidt | |
| 7,369,854 B2 | 5/2008 | Gallagher et al. | |
| 2001/0041572 A1 | 11/2001 | Lundqvist et al. | |
| 2002/0049061 A1 | 4/2002 | Pinola | |
| 2002/0082014 A1 | 6/2002 | Andersson et al. | |
| 2002/0094817 A1 | 7/2002 | Rune et al. | |
| 2002/0111180 A1 | 8/2002 | Hogan et al. | |
| 2002/0123348 A1 | 9/2002 | Willars et al. | |
| 2002/0131387 A1 | 9/2002 | Pitcher et al. | |
| 2002/0151304 A1 | 10/2002 | Hogan | |
| 2002/0187793 A1 | 12/2002 | Papadimitriou et al. | |
| 2003/0013443 A1 | 1/2003 | Willars et al. | |
| 2003/0119501 A1 | 6/2003 | Kim | |
| 2003/0214925 A1 | 11/2003 | Diaz Cervera et al. | |
| 2004/0037237 A1* | 2/2004 | Lalwaney | 370/320 |
| 2004/0053630 A1 | 3/2004 | Ramos et al. | |
| 2004/0057420 A1 | 3/2004 | Curcio et al. | |
| 2004/0058606 A1 | 3/2004 | Artamo et al. | |
| 2004/0092259 A1 | 5/2004 | Blanc et al. | |
| 2004/0132486 A1 | 7/2004 | Halonen et al. | |
| 2004/0157600 A1 | 8/2004 | Strumpert et al. | |
| 2004/0203346 A1 | 10/2004 | Myhre et al. | |
| 2004/0203737 A1 | 10/2004 | Myhre et al. | |
| 2004/0203800 A1 | 10/2004 | Myhre et al. | |
| 2004/0204097 A1* | 10/2004 | Scheinert et al. | 455/561 |
| 2004/0258070 A1 | 12/2004 | Arima | |
| 2005/0130644 A1 | 6/2005 | Bassompierre et al. | |
| 2005/0157673 A1 | 7/2005 | Verma et al. | |
| 2005/0201281 A1 | 9/2005 | Damnjanovic et al. | |
| 2005/0202828 A1 | 9/2005 | Pecen et al. | |
| 2005/0239453 A1* | 10/2005 | Vikberg et al. | 455/426.1 |
| 2006/0040664 A1 | 2/2006 | Murray et al. | |
| 2006/0246899 A1* | 11/2006 | Buckley et al. | 455/435.2 |
| 2007/0097938 A1 | 5/2007 | Nylander et al. | |
| 2007/0097939 A1 | 5/2007 | Nylander et al. | |
| 2007/0105527 A1 | 5/2007 | Nylander et al. | |
| 2007/0105568 A1 | 5/2007 | Nylander et al. | |
| 2007/0121540 A1 | 5/2007 | Sharp et al. | |
| 2008/0070565 A1 | 3/2008 | Maeda | |

FOREIGN PATENT DOCUMENTS

| | | |
|---|---|---|
| EP | 1 351 530 A1 | 10/2003 |
| EP | 1 363 468 A1 | 11/2003 |
| EP | 1 549 097 A1 | 6/2005 |
| GB | 2 428 942 A | 2/2007 |
| WO | 98/25431 A1 | 6/1998 |
| WO | 99/41932 | 8/1999 |
| WO | 01/80582 A2 | 10/2001 |
| WO | 02/065808 A1 | 8/2002 |
| WO | 03/105380 A1 | 12/2003 |
| WO | 2004/039111 A1 | 5/2004 |
| WO | 2004/040938 A1 | 5/2004 |
| WO | 2005/065214 A2 | 7/2005 |
| WO | 2005/079087 A1 | 8/2005 |
| WO | 2005/086421 A1 | 9/2005 |
| WO | 2005/12101 A1 | 12/2005 |

OTHER PUBLICATIONS

International Search Report and Written Opinion mailed May 9, 2007 in PCT application PCT/SE06/050373.

International Search Report and Written Opinion for PCT/SE2006/050367 mailed Feb. 9, 2007.

Menolascino et al, "Third Generation Mobile Systems Planning Issues", Vehicular Technology Conference, 1998, VTC 98, 48$^{th}$ IEEE Ottawa, Ont., Canada, May 18-21, 1998, New York, NY, USA, IEEE, US ISBN 0-6\7803-4320-4, pp. 830-834, esp. Section II F.

International Search Report and Written Opinion mailed Feb. 27, 2007 in PCT application No. PCT/SE2006/050371.

U.S. Appl. No. 11/538,081, entitled "Access Control in Radio Access Network Having PICO Base Stations", filed Oct. 3, 2006.

U.S. Appl. No. 11/380,824, filed Apr. 28, 2006, entitled "Dynamic Building of Monitored Set".

International Search Report and Written Opinion mailed Mar. 29, 2007 in PCT application PCT/SE2006/050355.

International Search Report and Written Opinion mailed Feb. 27, 2007 in PCT application PCT/SE2006/052370.

U.S. Office Action mailed Nov. 25, 2008 in U.S. Appl. No. 11/538,081.

U.S. Office Action mailed Dec. 8, 2008, in U.S. Appl. No. 11/538,080.

U.S. Office Action mailed Dec. 30, 2008 in U.S. Appl. No. 11/538,078.

U.S. Office Action mailed Sep. 12, 2008 in U.S. Appl. No. 11/380,824.

U.S. Office Action mailed Feb. 4, 2009 in U.S. Appl. No. 11/538,077.

U.S. Office Action mailed Jul. 15, 2009 in corresponding U.S. Appl. No. 11/538,078.

U.S. Office Action mailed Dec. 11, 2009 in U.S. Appl. No. 11/538,088.

U.S. Office Action mailed Mar. 4, 2010 in U.S. Appl. No. 11/538,077.

* cited by examiner

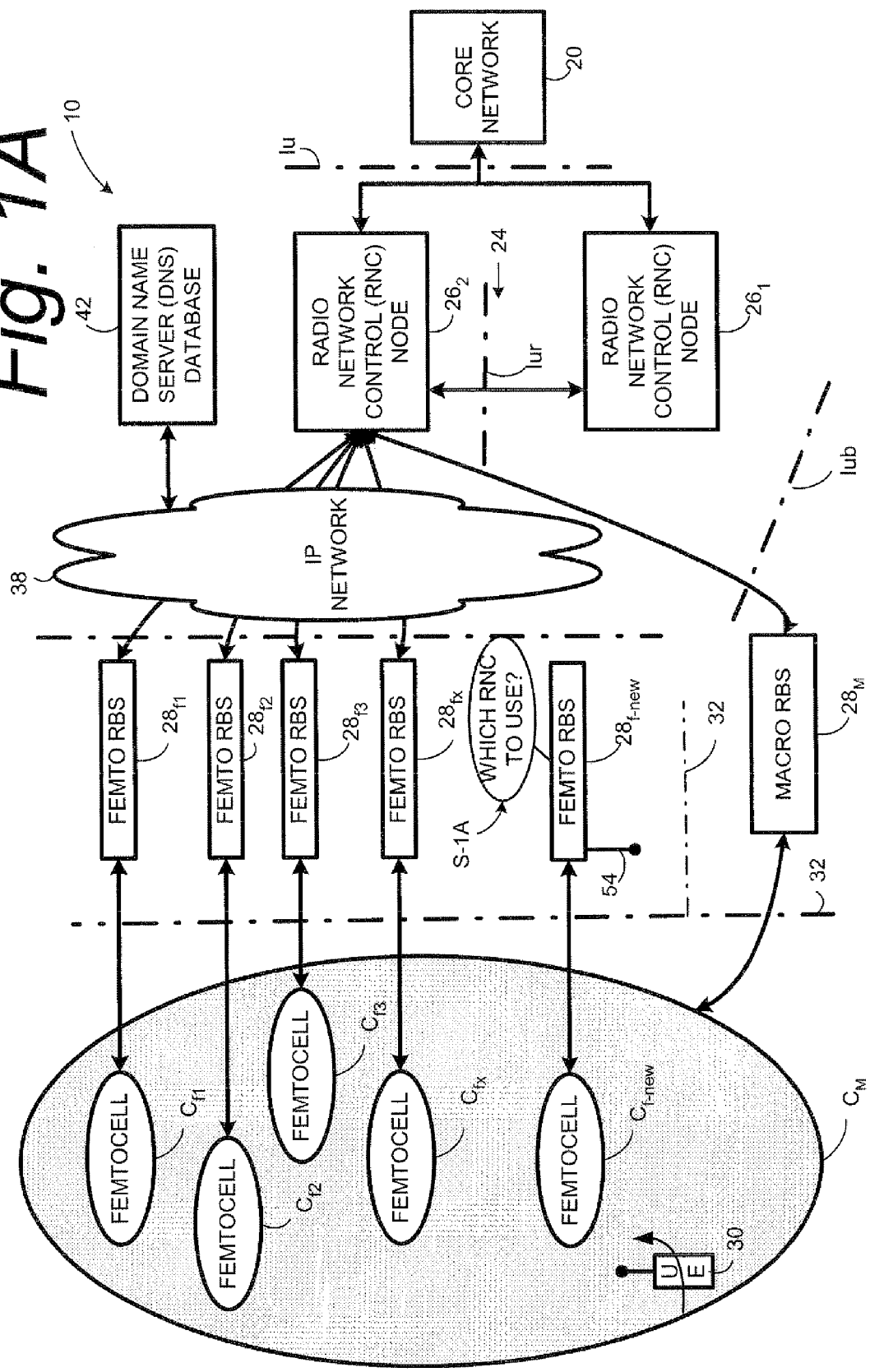

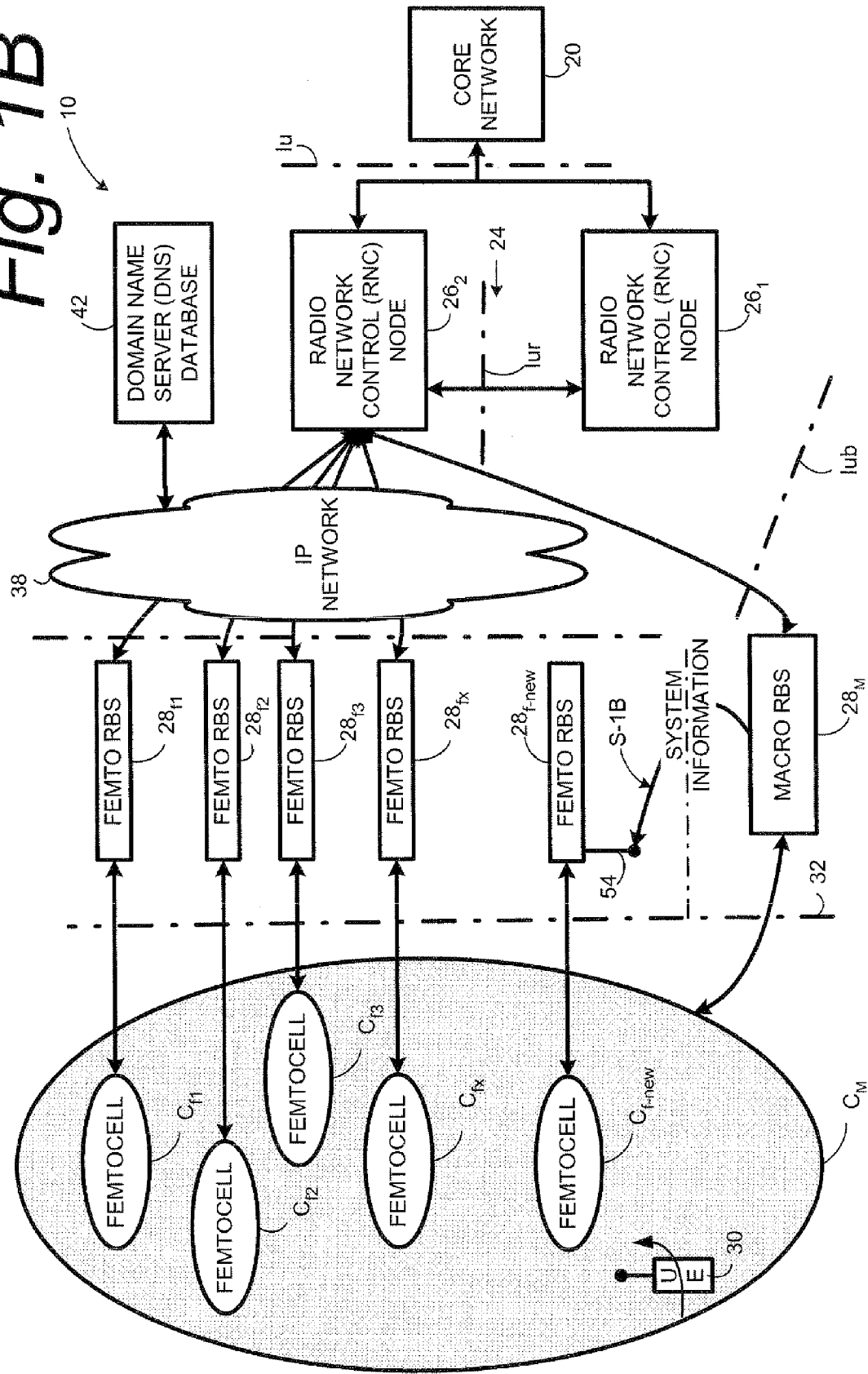

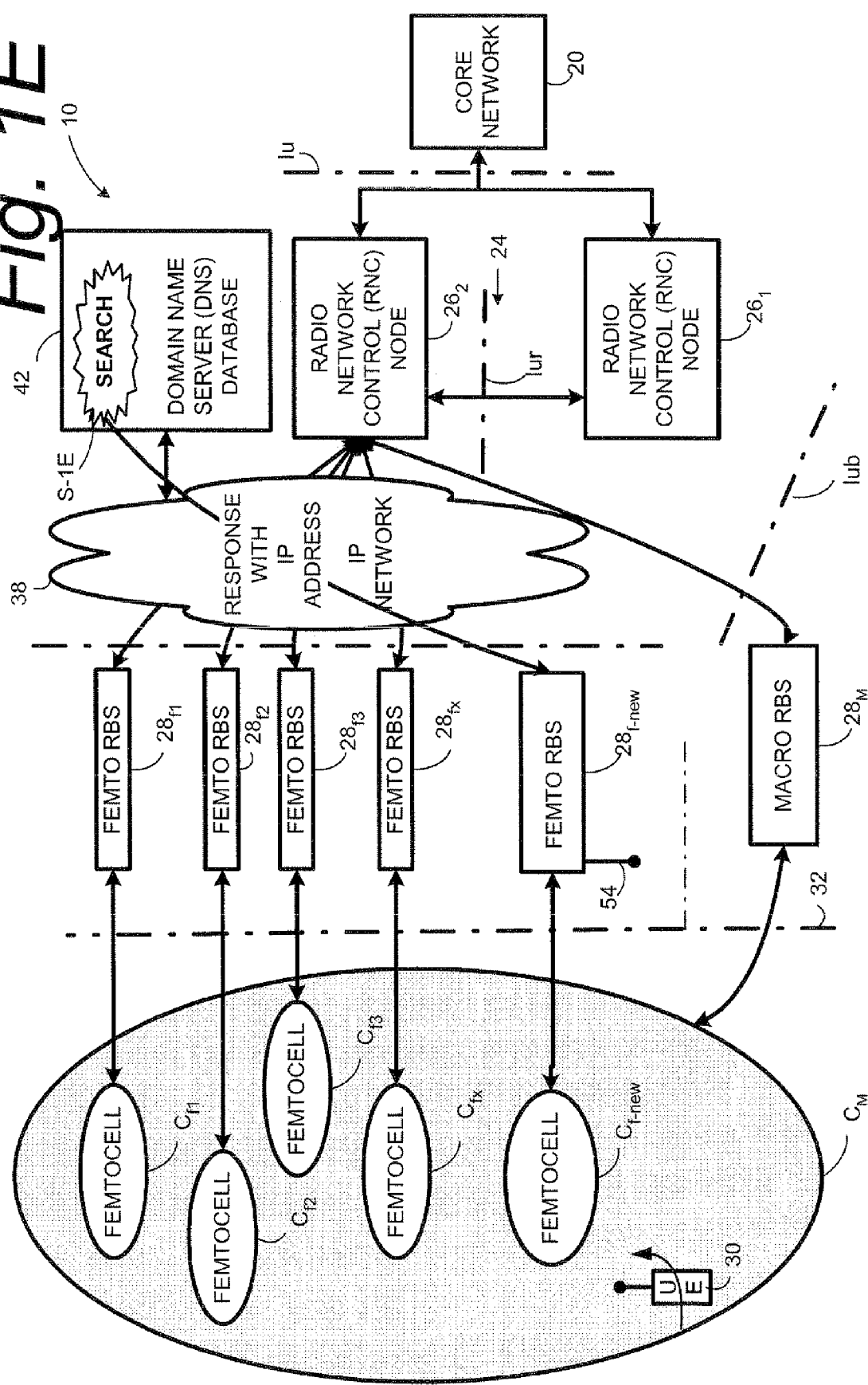

Fig. 4

| DOMAIN NAME SERVER DATABASE | | 42 |
|---|---|
| QUERY (INCLUDES FQDN) | IP ADDRESS OF ASSOCIATED RNC |
| QUERY 1-1 | IP ADDRESS 1 |
| QUERY 1-2 | IP ADDRESS 1 |
| .... | .... |
| QUERY 1-k | IP ADDRESS 1 |
| .... | .... |
| QUERY L-1 | IP ADDRESS L |
| QUERY L-2 | IP ADDRESS L |
| .... | .... |
| QUERY L-k | IP ADDRESS L |

RADIO NETWORK CONTROLLER SELECTION FOR IP-CONNECTED RADIO BASE STATION

CROSS REFERENCE TO RELATED APPLICATIONS

This application claims the benefit and priority of the following U.S. provisional patent applications (all of which are incorporated herein by reference in their entirety):

U.S. Provisional Patent Application 60/722,983 Oct. 4, 2005, entitled "REDIRECTION OF IP-CONNECTED RBS TO THE CORRECT RNC";

U.S. Provisional Patent Application 60/722,984 Oct. 4, 2005, entitled "AUTOMATIC RNC SELECTION FOR IP-CONNECTED RBS";

U.S. Provisional Patent Application 60/722,982 Oct. 4, 2005, entitled FINE-GRAINED ACCESS CONTROL IN A WCDMA SYSTEM USING PICO BASE STATIONS";

U.S. Provisional Patent Application 60/723,946 Oct. 6, 2005, entitled "PAGING FOR A WCDMA SYSTEM USING PICO BASE STATIONS";

U.S. Provisional Patent Application 60/728,780 Oct. 21, 2005, entitled "AUTOMATIC BUILDING OF NEIGHBOR LISTS IN A MOBILE SYSTEM"; and U.S. Provisional Patent Application 60/731,495 Oct. 31, 2005, entitled "AUTOMATIC CONFIGURATION OF THE MACRO RADIO IN A PICO BASE STATION".

This application is related to the following U.S. patent applications (all of which are incorporated herein by reference in their entirety):

U.S. patent application Ser. No. 11/538,088, filed on even date herewith, entitled "REDIRECTION OF IP-CONNECTED RADIO BASE STATION TO CORRECT CONTROL NODE";

U.S. patent application Ser. No. 11/538,081, filed on even date herewith, entitled "ACCESS CONTROL IN A RADIO ACCESS NETWORK HAVING PICO BASE STATIONS";

U.S. patent application Ser. No. 11/538,080, filed on even date herewith, entitled "PAGING FOR A RADIO ACCESS NETWORK HAVING PICO BASE STATIONS";

U.S. patent application Ser. No. 11/538,077, filed on even date herewith, entitled "AUTOMATIC BUILDING OF NEIGHBOR LISTS IN A MOBILE SYSTEM";

U.S. patent application Ser. No. 11/538,078, filed on even date herewith, entitled "AUTOMATIC CONFIGURATION OF MACRO RECEIVER OF PICO RADIO BASE STATION"; and, U.S. patent application Ser. No. 11/380,824, filed Apr. 28, 2006, entitled "DYNAMIC BUILDING OF MONITORED SET".

BACKGROUND

I. Technical Field

This invention pertains to wireless telecommunications, and particularly to operation of a "femto" or "pico" radio base station of a radio access network.

II. Related Art and Other Considerations

In a typical cellular radio system, wireless user equipment units (UEs) communicate via a radio access network (RAN) to one or more core networks. The user equipment units (UEs) can be mobile stations such as mobile telephones ("cellular" telephones) and laptops with mobile termination, and thus can be, for example, portable, pocket, hand-held, computer-included, or car-mounted mobile devices which communicate voice and/or data with radio access network. Alternatively, the wireless user equipment units can be fixed wireless devices, e.g., fixed cellular devices/terminals which are part of a wireless local loop or the like.

The radio access network (RAN) covers a geographical area which is divided into cell areas, with each cell area being served by a base station. A cell is a geographical area where radio coverage is provided by the radio base station equipment at a base station site. Each cell is identified by a unique identity, which is broadcast in the cell. The base stations communicate over the air interface with the user equipment units (UE) within range of the base stations. In the radio access network, several base stations are typically connected (e.g., by landlines or microwave) to a radio network controller (RNC). The radio network controller, also sometimes termed a base station controller (BSC), supervises and coordinates various activities of the plural base stations connected thereto. The radio network controllers are typically connected to one or more core networks. The core network has two service domains, with an RNC having an interface to both of these domains.

One example of a radio access network is the Universal Mobile Telecommunications (UMTS) Terrestrial Radio Access Network (UTRAN). The UMTS is a third generation system which in some respects builds upon the radio access technology known as Global System for Mobile communications (GSM) developed in Europe. UTRAN is essentially a radio access network providing wideband code division multiple access (WCDMA) to user equipment units (UEs). The Third Generation Partnership Project (3GPP) has undertaken to evolve further the UTRAN and GSM-based radio access network technologies.

As those skilled in the art appreciate, in WCDMA technology a common frequency band allows simultaneous communication between a user equipment unit (UE) and plural base stations. Signals occupying the common frequency band are discriminated at the receiving station through spread spectrum CDMA waveform properties based on the use of a high speed, pseudo-noise (PN) code. These high speed PN codes are used to modulate signals transmitted from the base stations and the user equipment units (UEs). Transmitter stations using different PN codes (or a PN code offset in time) produce signals that can be separately demodulated at a receiving station. The high speed PN modulation also allows the receiving station to advantageously generate a received signal from a single transmitting station by combining several distinct propagation paths of the transmitted signal. In CDMA, therefore, a user equipment unit (UE) need not switch frequency when handover of a connection is made from one cell to another. As a result, a destination cell can support a connection to a user equipment unit (UE) at the same time the origination cell continues to service the connection. Since the user equipment unit (UE) is always communicating through at least one cell during handover, there is no disruption to the call. Hence, the term "soft handover." In contrast to hard handover, soft handover is a "make-before-break" switching operation.

Other types of telecommunications systems which encompass radio access networks include the following: Global System for Mobile communications (GSM); Advance Mobile Phone Service (AMPS) system; the Narrowband AMPS system (NAMPS); the Total Access Communications System (TACS); the Personal Digital Cellular (PDC) system; the U.S. Digital Cellular (USDC) system; and the code division multiple access (CDMA) system described in EIA/TIA IS-95.

There are several interfaces of interest in the UTRAN. The interface between the radio network controllers (RNCs) and the core network(s) is termed the "Iu" interface. The interface between a radio network controller (RNC) and its base stations (BSs) is termed the "Iub" interface. The interface between the user equipment unit (UE) and the base stations is known as the "air interface" or the "radio interface" or "Uu interface". In some instances, a connection involves both a Source and Serving RNC (SRNC) and a target or drift RNC (DRNC), with the SRNC controlling the connection but with one or more diversity legs of the connection being handled by the DRNC. An Inter-RNC transport link can be utilized for the transport of control and data signals between Source RNC and a Drift or Target RNC, and can be either a direct link or a logical link. An interface between radio network controllers (e.g., between a Serving RNC [SRNC] and a Drift RNC [DRNC]) is termed the "Iur" interface.

The radio network controller (RNC) controls the UTRAN. In fulfilling its control role, the RNC manages resources of the UTRAN. Such resources managed by the RNC include (among others) the downlink (DL) power transmitted by the base stations; the uplink (UL) interference perceived by the base stations; and the hardware situated at the base stations.

Those skilled in the art appreciate that, with respect to a certain RAN-UE connection, an RNC can either have the role of a serving RNC (SRNC) or the role of a drift RNC (DRNC). If an RNC is a serving RNC (SRNC), the RNC is in charge of the connection with the user equipment unit (UE), e.g., it has full control of the connection within the radio access network (RAN). A serving RNC (SRNC) is connected to the core network. On the other hand, if an RNC is a drift RNC (DRNC), it supports the serving RNC (SRNC) by supplying radio resources (within the cells controlled by the drift RNC (DRNC)) needed for a connection with the user equipment unit (UE). A system which includes the drift radio network controller (DRNC) and the base stations controlled over the Iub Interface by the drift radio network controller (DRNC) is herein referenced as a DRNC subsystem or DRNS. An RNC is said to be the Controlling RNC (CRNC) for the base stations connected to it by an Iub interface. This CRNC role is not UE specific. The CRNC is, among other things, responsible for handling radio resource management for the cells in the base stations connected to it by the Iub interface.

Some operators are investigating the possibility of providing home or small area WCDMA coverage for limited number of users using a small radio base station ("RBS"), also called a "Femto RBS" and/or a "Home RBS" and/or "pico RBS" and/or "micro RBS" in some contexts. According to such investigation, the small RBS would provide normal WCDMA coverage for the end users (e.g., to a user equipment unit (UE)), and would be connected to the RNC using some kind of IP based transmission. The coverage area so provided is called a "femto cell" (to indicate that the coverage area is relatively small). Other terminology for a femto cell includes "pico cell" or "micro cell", which is in contrast to a macro cell covered by a macro or standard radio base station (RBS).

One alternative for the IP based transmission is to use Fixed Broadband access (like xDSL, Cable etc.) to connect the home RBS to the RNC. Another alternative would be to use Wireless Broadband access (e.g. HSDPA and Enhanced Uplink; or WiMAX). FIG. 5 illustrates the two different backhaul alternatives in more detail. The first alternative is labeled "xDSL Backhaul" and the second alternative is labeled "WiMAX Backhaul".

In general, ordinary WCDMA base stations (macro RBS) are able to connect to an RNC using IP-based transmission. Operator personnel, e.g., employees of an operator company which owns or maintains the macro RBS nodes and RNC nodes of the radio access network (RAN), typically install the macro RBS nodes. As part of the installation, the macro RBS is manually configured with IP addressing information (DNS name, Fully Qualified Domain Name, FQDN, or IP-address) of the RNC to which the macro RNC is to connect.

By contrast, a femto RBS is typically installed by the end user rather than the network operator. The end users are also able to move the Femto RBS geographically from place to place without the operator being able or willing to control relocation of the femto RBS. Such user-directed relocation requires that, wherever the Femto RBS is installed or located, it should connect to the correct RNC. A "correct RNC" or "preferred RNC" or "appropriate RNC" in this sense would be the same RNC that is controlling the overlaying macro cell of the radio access network (RAN).

Connection to the correct RNC is important since, e.g., it also improves the building of the neighboring cell lists that are needed for roaming and handover between the femto RBS and macro RBS cells. In addition it also minimizes network signaling between control nodes.

Thus, the current technique of manually configuring the RBS with the RNC IP addressing information does not work for the femto RBS scenario, since, e.g., the femto RBS is to be installed by the end users.

What is needed, therefore, and an object herein provided, are method, technique, apparatus, and systems for connecting to a correct RNC to serve an femto RBS, for example an IP-connected femto RBS.

BRIEF SUMMARY

Methods and apparatus enable a femto radio base station to be connected to an appropriate radio network controller node of a radio access network for use as an active radio network controller node for the femto radio base station. The femto radio base station prepares a node address inquiry which is used for obtaining an internet protocol (IP) address of an appropriate radio network controller node. Upon receiving a response to the node address inquiry, the femto radio base station further uses the internet protocol (IP) address of an appropriate radio network controller node for connecting to the appropriate radio network controller node as its active radio network controller node.

In some example embodiments and modes, the connection is accomplished by using system information (e.g., location-indicative information) of the radio access network obtained from resident receiver at the femto radio base station.

The femto radio base station uses at least part of the system information for preparing the node address inquiry and for using the node address inquiry for obtaining the internet protocol (IP) address of an appropriate radio network controller node. Upon receipt of a response to the node address inquiry, the femto radio base station further uses the internet protocol (IP) address of an appropriate radio network controller node for connecting to the appropriate radio network controller node as its active radio network controller node.

In one of its aspects, the technology concerns a method of operating a radio access network. The method includes basic example steps of preparing and sending a node address inquiry; using the node address inquiry for obtaining an internet protocol (IP) address of an appropriate radio network controller node; and, using the internet protocol (IP) address for connecting the femto radio base station to the appropriate radio network controller node as an active radio network controller node for the femto radio base station. In some example embodiments and mode, the method further includes acquiring, at the femto radio base station and over a radio interface, system information broadcast in a radio access network and using at least part of the system information for preparing and sending the node address inquiry.

Another aspect of the technology concerns an example embodiment of a femto radio base station which comprises a resident radio receiver for receiving system information broadcast in a radio access network over an air interface. The femto radio base station also comprises means for using at least part of the system information for preparing a node address inquiry, as well as an Internet Protocol (IP) interface. The IP interface serves for sending the node address request inquiry including the at least part of the system information to a database, for receiving, as a response to the inquiry, an internet protocol (IP) address of an appropriate radio network controller node, and for using the address of the appropriate radio network controller node for connecting the femto radio base station to the appropriate radio network controller node as an active radio network control node for the at least one femto radio base station.

Yet another aspect of the technology concerns a radio access network which comprises a database; plural radio network controller nodes, and at least one femto radio base station such as that above summarized.

In differing implementations, the system information broadcast by a macro radio base station in a macro cell overlaying the femto cell and received by the femto radio base station comprises at least one of (1) PLMN-ID; (2) Location Area Code (LAC); and (3) Cell Identity (CI).

In some embodiments and modes, the femto radio base station uses the at least part of the system information for constructing or preparing a node address inquiry in the form of a fully qualified domain name (FQDN). The fully qualified domain name (FQDN) is then used to query a domain name system (DNS) database for obtaining the internet protocol (IP) address of the appropriate radio network controller node for connectivity to the femto radio base station. The fully qualified domain name (FQDN), which is at least partially formed using at least part of the broadcast system information, can comprise a combination of portions of two or more of (1) PLMN-ID; (2) Location Area Code (LAC); and (3) Cell Identity (CI), such combination possibly being a concatenation of portions of two or more of (1) PLMN-ID; (2) Location Area Code (LAC); and (3) Cell Identity (CI).

In some example embodiments and modes, the femto radio base station sends a query including the fully qualified domain name (FQDN) directly to the domain name system (DNS) database for obtaining the internet protocol (IP) address of the appropriate radio network controller node. In other example embodiments and modes, the femto radio base station sends a query including the fully qualified domain name (FQDN) to a radio network controller node. The radio network controller node forwards the fully qualified domain name (FQDN) to the domain name system (DNS) database for obtaining the internet protocol (IP) address of the appropriate radio network controller node. Upon receiving the internet protocol (IP) address of the appropriate radio network controller node, the radio network controller node forwards the same to the femto radio base station. In yet other example embodiments and modes, the femto radio base station sends a query including the fully qualified domain name (FQDN) to a generic redirector node, and the generic redirector node forwards the fully qualified domain name (FQDN) to the domain name system (DNS) database for obtaining the internet protocol (IP) address of the appropriate radio network controller node. Upon receiving the internet protocol (IP) address of the appropriate radio network controller node, the generic redirector node forwards the same to the femto radio base station.

In some embodiments and modes, the femto radio base station uses one or both of the at least part of the system information and an identifier for the femto radio base station for constructing or preparing a node address inquiry in the form of a node address request message. The femto radio base station sends the node address request message to a radio network controller node or to a generic redirector node. The radio network controller node or the generic redirector node, as the case may be, forwards one or both of the at least part of the system information and the identifier for the femto radio base station included in the node address message to the database for obtaining the internet protocol (IP) address of the appropriate radio network controller node. The database can be co-located at or distinct from the radio network controller node and the generic redirector node. Upon receiving the internet protocol (IP) address of the appropriate radio network controller node, the radio network controller node (or the generic redirector node) forwards the same to the femto radio base station. In some example embodiments, the femto radio base station can use the at least part of the system information and an identifier for the femto radio base station for obtaining from the database the internet protocol (IP) address of the appropriate radio network controller node for connectivity to the femto radio base station. The identifier for the femto radio base station can comprise at least one of a hardware identifier for the femto radio base station, a serial number for the femto radio base station, and an owner/operator number for the femto radio base station.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 1A-FIG. 1F are diagrammatic views of an example embodiment of a telecommunications system including a radio access network, showing sequential stages of an operation of connecting a femto radio base station to an appropriate radio network control node.

FIG. 4 is a diagrammatic view of an example structure of a domain name system (DNS) database.

DETAILED DESCRIPTION

Figure 1C:
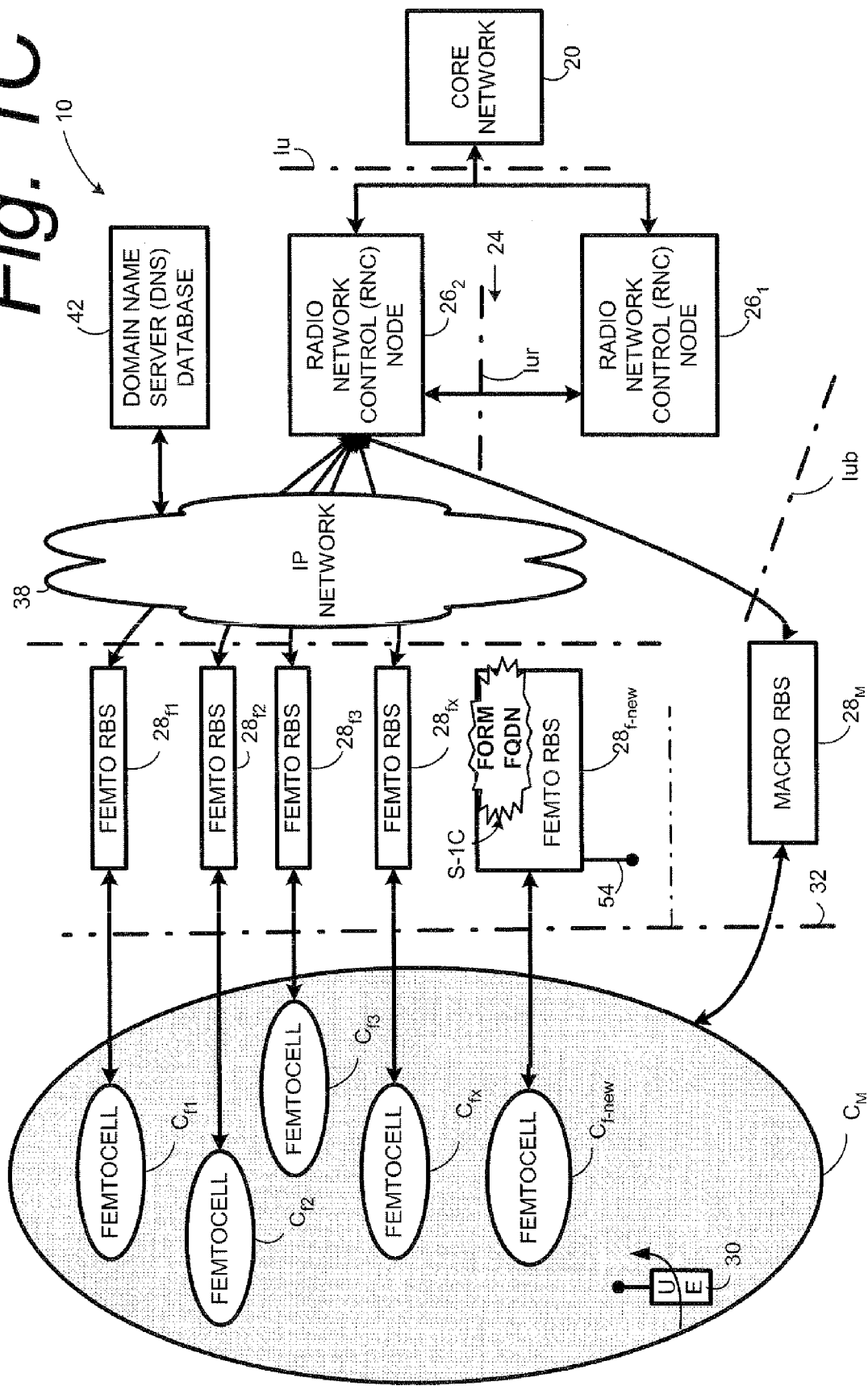

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope. In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks labeled as "processors" or "controllers" may be provided through the use of dedicated hardware as well as hardware capable of executing software in association with appropriate software. When provided by a processor, the functions may be provided by a single dedicated processor, by a single shared processor, or by a plurality of individual processors, some of which may be shared or distributed. Moreover, explicit use of the term "processor" or "controller" should not be construed to refer exclusively to hardware capable of executing software, and may include, without limitation, digital signal processor (DSP) hardware, read only memory (ROM) for storing software, random access memory (RAM), and non-volatile storage.

The present invention is described in the non-limiting, example context of a telecommunications system 10 shown in FIG. 1A. The telecommunications system 10 connects to a core network 20. The telecommunications system 10 comprises a radio access network 24. The radio access network 24 includes one or more radio network controller nodes (RNCs) 26 and one or more radio base stations (BS) 28. For sake of example FIG. 1A particular shows two radio network control nodes, i.e., a first radio network control $26_1$ and a second radio network control $26_2$ as well as both a macro radio base station (only one macro radio base station $28_M$ being shown in FIG. 1A) and plural femto radio base stations $28_{f1}, 28_{f2}, \ldots 28_{fx}$. The macro radio base station $28_M$ serves a macrocell $C_M$. The femto radio base stations $28_{f1}, 28_{f2}, \ldots 28_{fx}$ serve respective femtocells $C_{f1}, C_{f2}, \ldots C_{fx}$. The person skilled in the art understands that a radio base station is typically situated at an interior (e.g., center) of the respective cell which the radio base station serves, but for sake of clarity the macro radio base station and femto radio base stations of FIG. 1A are shown instead as being associated by double headed arrows to their respective cells. At least some of the femtocells $C_{f1}, C_{f2}, \ldots C_{fx}$ are geographically overlayed or overlapped by the macrocell $C_M$.

As used herein, a "femto radio base station" also has the meaning of a pico radio base station or a micro radio base station, which serves a femto cell (or pico cell or micro cell). The femto cell is typically overlaid by one or more macro cells and serves a smaller geographic area or subscriber constituency than a macro cell. The technology described herein has particular benefit for a femto radio base station which can be installed and/or relocated within a radio access network without the installation or relocation being controlled by the owner/operator of the radio access network. In other words, a non-network operator entity (a femto operator) can acquire the femto radio base station and situate the femto radio base station in accordance with the preferences of the femto operator. In this regard, FIG. 1A happens to show such a femto radio base station $28_{f\text{-}new}$ which has recently been activated by a femto operator. The femto radio base station $28_{f\text{-}new}$ has its femto cell $C_{f\text{-}new}$ situated or located geographically so as to be overlaid by macrocell $C_M$.

A user equipment unit (UE), such as user equipment unit (UE) 30 shown in FIG. 1A, communicates with one or more cells or one or more base stations (BS) 28 over a radio or air interface 32. The user equipment unit can be a mobile station such as a mobile telephone ("cellular" telephone) and laptop with mobile termination, and thus can be, for example, portable, pocket, hand-held, computer-included, or car-mounted mobile device which communicate voice and/or data with radio access network.

The radio access network 24 shown in FIG. 1A can be, by way of non-limiting example, a UMTS Terrestrial Radio Access Network (UTRAN). In the UTRAN, radio access is preferably based upon Wideband Code Division Multiple Access (WCDMA) with individual radio channels allocated using CDMA spreading codes. Of course, other access methods may be employed. The nodes 26 and 28 are respectively termed the radio network control node and the radio base station nodes in view of the UTRAN example. However, it should be understood that the term radio network control and radio base station also encompasses nodes having similar functionality for other types of radio access networks. Other types of telecommunications systems which encompass other types of radio access networks include the following: Global System for Mobile communications (GSM); Advance Mobile Phone Service (AMPS) system; the Narrowband AMPS system (NAMPS); the Total Access Communications System (TACS); the Personal Digital Cellular (PDC) system; the U.S. Digital Cellular (USDC) system; and the code division multiple access (CDMA) system described in EIA/TIA IS-95.

The radio access network 24 is connected to core network 20 over an interface, such as the Iu interface for UTRAN. The core network 20 of FIG. 1A can comprise, among other things a Mobile Switching Center (MSC) node, a Gateway MSC node (GMSC), a Gateway General Packet Radio Service (GPRS) support node (GGSN), and a Serving GPRS Support node (SGSN). Circuit switched (CS) network or packet switched (PS) network can be connected to core network 20.

For sake of simplicity, the radio access network 24 of FIG. 1A is shown with only two RNC nodes 26. Multiple radio network controller nodes (RNCs) may be provided, with each RNC 26 being connected to one or more base stations (BS) 28. It will be appreciated that a different number of base stations than that shown in FIG. 1A can be served by a radio network control 26, and that RNCs need not serve the same number of base stations. Moreover, an RNC can be connected over an Iur interface to one or more other RNCs in radio access network 24. The radio network controller node (RNC) 26 communicates over an established communication path on an interface Iub with the macro radio base station $28_M$. Further, those skilled in the art will also appreciate that a base station such as the macro radio base station 28 is sometimes also referred to in the art as a radio base station, a node B, or B-node. Each of the radio interface 32, the Iu interface, the Iur interface, and the Iub interface are shown by dash-dotted lines in FIG. 1A.

In FIG. 1A, the femto radio base stations $28_f$ are connected to a communications network 38. An example of such communications network is an IP network 38.

FIG. 1A also shows that the radio access network 24 also comprises domain name system (DNS) database 42. The domain name system (DNS) database 42 is connected to IP network 38. The remote unit domain name system (DNS) database 42 may be provided as a separate node of radio access network 24 as shown, or may be an adjunct of another node (e.g., included in one or more radio network controller nodes (RNCs) 26). Alternatively, in certain cases, access to domain name system (DNS) database 42 can even be provided through core network 20.

The domain name system (DNS) database 42 is configured so that, when queried by a FQDN, the domain name system (DNS) database 42 returns the internet protocol (IP) address of an appropriate radio network controller node which corresponds to the queried FQDN.

As shown by an example format depicted in FIG. 4, domain name system (DNS) database 42 stores information for associating one or more sets of Fully Qualified Domain Names (FQDNs) with a particular radio network controller node, so that when queried the IP network address of the particular radio network controller node that matches the FQDN included in the query can be returned in response to the query. As explained hereinafter, in such query and response process the domain name system (DNS) database 42 returns to a quering femto radio base station the address of an appropriate (e.g., an optimum or preferred) radio network controller node to which to the femto radio base station should connect and use as its active radio network controller node.

FIG. 1A can be viewed as illustrating generic access of femto radio base station $28_{f\text{-}new}$ to the radio access network (RAN), e.g., to its radio network controller node (e.g., radio network controller node 26, in the specifically illustrated scenario). By "generic access" is meant that the access afforded to femto radio base station $28_{f\text{-}new}$ can be either broadband fixed access or broadband wireless (mobile) access (e.g., WiMAX) as described above. In broadband wireless (mobile) access, access for femto radio base station $28_{f\text{-}new}$ to the radio access network 24 is through a macro radio base station, and can occur using, e.g. High Speed Downlink Packet Access (HSDPA) and Enhanced Uplink; or WiMAX. To cater generically to the access types, in FIG. 1A the femto radio base stations $28_f$ including femto radio base stations $28_{f\text{-}new}$ are connected to a communications network 38. An example of such communications network is an IP network 38. Unless otherwise specifically exempted in its context, aspects of the technology described herein are applicable to all types of access, including broadband fixed access and broadband mobile access (e.g., broadband wireless access).

Figure 2:
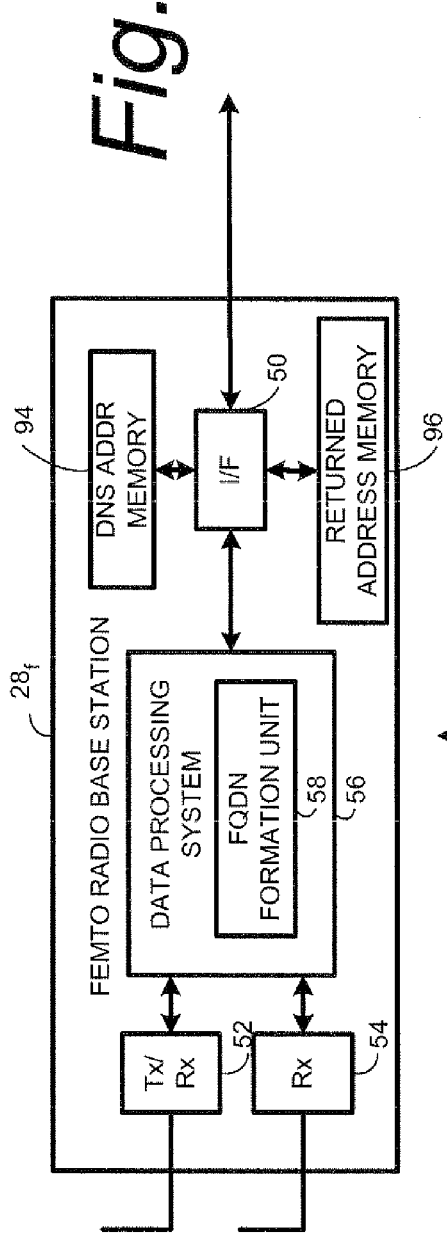
FIG. 2 is a schematic view of an example embodiment of a femto radio base station.

FIG. 2 illustrates basic, selected, representative constituent elements of an example generic femto radio base station $28_f$. One or more of the femto radio base stations $28_{f1}, 28_{f2}, \ldots 28_{fx}$ can take the form of the generic femto radio base station $28_f$ shown of FIG. 2. The femto radio base station $28_f$ of FIG. 2 is shown as including, among its other unillustrated constituent units, an IP interface unit 50; one or more radio frequency transceivers 52, a radio frequency receiver 54; and, a data processing system, section, or unit 56.

The radio frequency transceivers 52 are for communicating over the radio or air interface with user equipment units (UEs) in the femtocell served by the femto radio base station $28_f$. The number of radio frequency transceivers 52 depends on various factors including capacity of the femto radio base station to handle mobile connections.

In the illustrated embodiment, receiver 54 is resident at femto radio base station $28_f$ and serves for acquiring, at a femto radio base station and over a radio interface, a system information broadcast in the radio access network 24. For example, in one example implementation the femto radio base station $28_f$ comprises or is equipped with a WCDMA receiver (a UE) as its radio frequency receiver 54, thereby enabling the femto radio base station to camp on signals from receivable cells (including both WCDMA macrocells and femtocells) and to read the relevant system or network information broadcast in those cells. In an example implementation, the system information broadcast by a macro radio base station in a macro cell overlaying the femto cell and received by the femto radio base station comprises at least one of (1) PLMN-ID; (2) Location Area Code (LAC); and (3) Cell Identity (CI).

Thus, as explained above, as the radio frequency receiver 54, the femto radio base station can be, in an example embodiment, equipped with, e.g., a WCDMA receiver or a UE and USIM. As explained subsequently, this UE/USIM can be used to connect to the Macro Cell that then provides the Mobile Broadband access to connect to the RNC.

The use of resident receiver 54 is just one example way in which the femto radio base station $28_f$ can acquire system or location-indicative information (the system or location-indicative information being utilized for formation, at least in part, of the FQDN. The technology described herein, and particularly including formation/use of a FQDN at a femto radio base station for query of a domain name system (DNS) database, is applicable to other embodiments wherein the femto radio base station lacks a resident receiver and must acquire system or location-indicative information externally, e.g., from user equipment units served by the femto radio base station, in the manner described in U.S. patent application Ser. No. 11 /538,088, filed on even date herewith, entitled "REDIRECTION OF IP-CONNECTED RBS TO THE CORRECT RNC", for example, which is incorporated herein by reference.

The RBS data processing system 56 includes a FQDN formation unit 58. As explained herein, FQDN formation unit 58 uses, at least in part, the system information or system information (acquired, e.g., by radio frequency receiver 54) for constructing a fully qualified domain name (FQDN). The FQDN formation unit 58 can be included as part of RBS data processing system 56 as shown, or provided as a distinct controller or processor, in the broad sense of those terms as previously mentioned.

Figure 3:
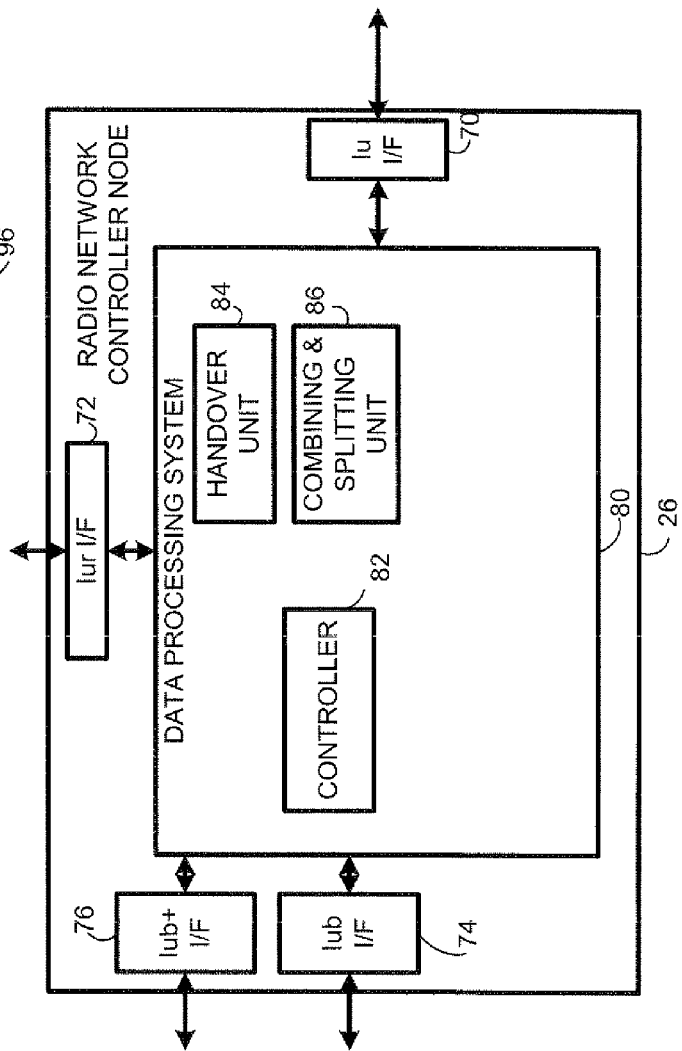
FIG. 3 is a schematic view of an example radio network control (RNC) node.
Figure 5:
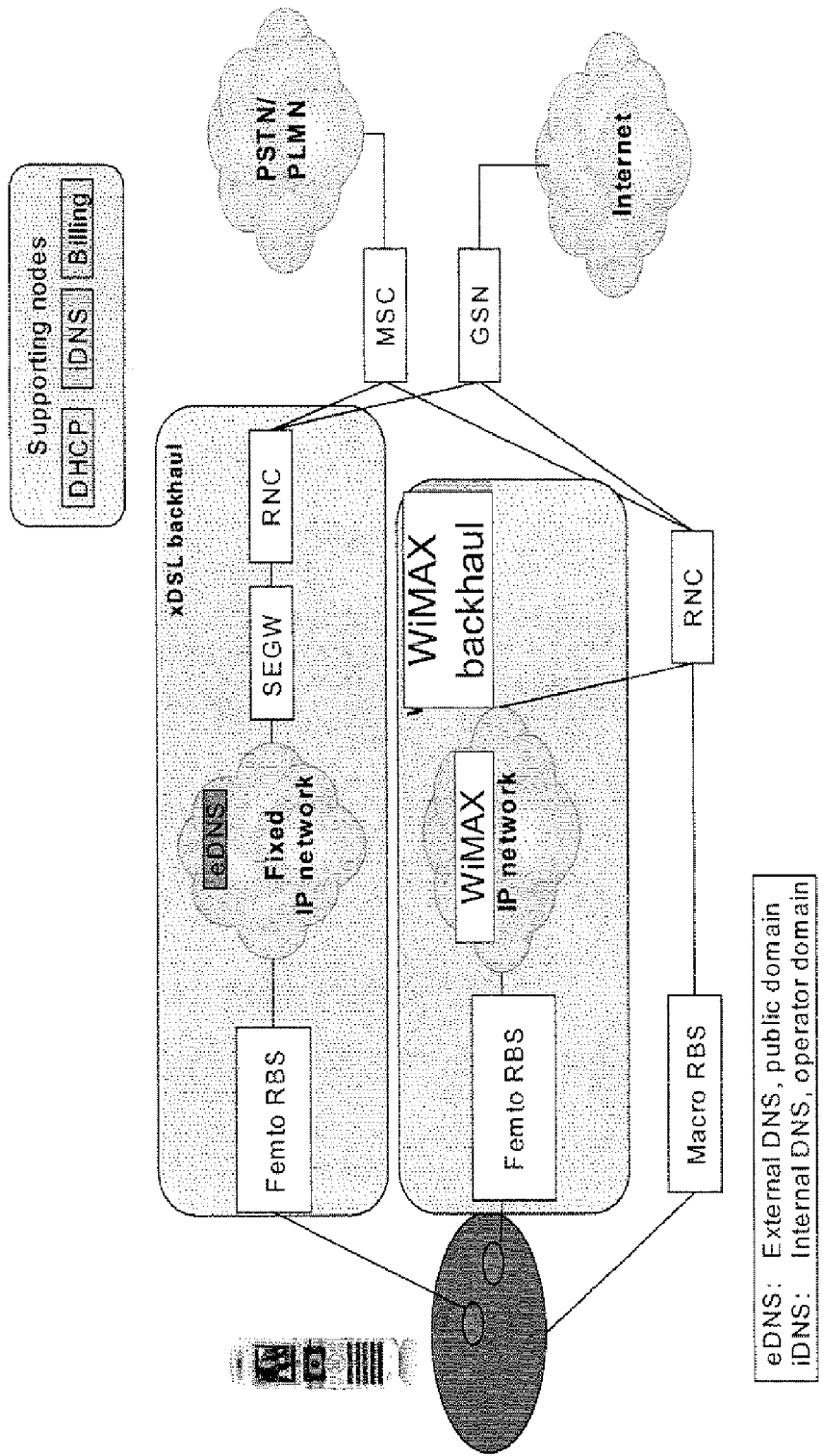
FIG. 5 is a diagrammatic view showing two different backhaul alternatives.

FIG. 3 illustrates basic, selected, representative constituent elements of an example radio network control node 26. The radio network control node 26 can comprise several interface units, such as an interface unit 70 for connecting radio network control node 26 over the Iu interface to core network 20; an interface unit 72 for connecting radio network control node 26 over the Iur interface to other (unillustrated) radio network controllers; one or more interface units 74 for connecting radio network control node 26 over the Iub interface to respective one or more macro radio base station $28_M$; and, one or more interface units 76 for connecting radio network control node 26 to respective one or more femto radio base stations $28_{f1}, 28_{f2}, \ldots 28_{fx}$. The connection between RNC 26 and the femto radio base stations $28_m$ can occur over communications network 38 and can utilize, e.g., Internet Protocol (IP)-based transmission. The connection between RNC 26 and the macro radio base station(s) $28_M$ can utilize, e.g., Internet Protocol (IP)-based and/or ATM-based transmission.

In addition to interface units, the radio network control node 26 comprises numerous unillustrated constituent units, as well as a data processing system, section, or unit 80. As shown in FIG. 3, in an example, non-limiting implementation the data processing system 80 of radio network control node 26 comprises a control section (e.g., controller 82); a handover unit 84; and, a combiner and splitter unit 86 (involved, e.g., in handling diversity legs of a connection).

At the time shown in FIG. 1A, femto radio base station $28_{f\text{-}new}$ has been just been activated by a femto operator. Immediately upon activation, femto radio base station $28_{f\text{-}new}$ (as shown by event or step S-1A) does not yet know its particular whereabouts in the environment of radio access network 24, and thus does not know which radio network controller node 26 is best situated (geographically or otherwise) to serve as the active radio network control for femto radio base station $28_{f\text{-}new}$. In the situation shown in FIG. 1A, femto radio base station $28_{f\text{-}new}$ is situated in a macrocell $C_M$, which is served by radio base station $26_M$ and second radio network controller node $26_2$. Therefore, judging from the topology of the radio access network 24, the correct/preferred radio network control node for femto radio base station $28_{f\text{-}new}$ is second radio network controller node $26_2$ rather than first radio network controller node $26_1$.

In view of its ignorance with respect to its own situation within radio access network 24, femto radio base station $28_{f\text{-}new}$ activates its radio frequency receiver 54 and, using radio frequency receiver 54, ascertains or acquires over the radio interface a system information broadcast in a radio access network 24. In this regard, FIG. 1B shows as event or step S-1B the acquisition of the system information.

The system information (also known as location-indicative information) can include one or more of the following: (1) PLMN-ID; (2) Location Area Code (LAC); and (3) Cell Identity (CI). The PLMN-ID can be decoded from the Master Information Block (MIB). The Location Area Code (LAC) can be decoded from the decode System Information Block 1 (SIB 1). The Cell Identity (CI) can be decoded from System Information Block 3 (SIB3). The UTRAN Cell Identity consists of 28 bits and normally the 12 of the bits are used to include a RNC-identifier. This means that cell identity (CI) can in these cases be used to identify the RNC in one PLMN.

FIG. 1C shows, as event or step S-1C, femto radio base station $28_{f\text{-}new}$ using at least part of the system information for constructing a fully qualified domain name (FQDN). Construction of the fully qualified domain name (FQDN) is performed by FQDN formation unit 58 of femto radio base station $28_{f\text{-}new}$.

Thus, after radio frequency receiver 54 has searched for the surrounding macro coverage and camped on the best UTRAN cell that is allowed for the UE which hosts radio frequency receiver 54. USIM information can be used to find out which PLMNs are allowed. The UE, e.g., radio frequency receiver 54, reads the relevant system information, which is conveyed to FQDN formation unit 58. The FQDN formation unit 58 then constructs a fully qualified domain name (FQDN) at least partially based on the system information.

Figure 1D:
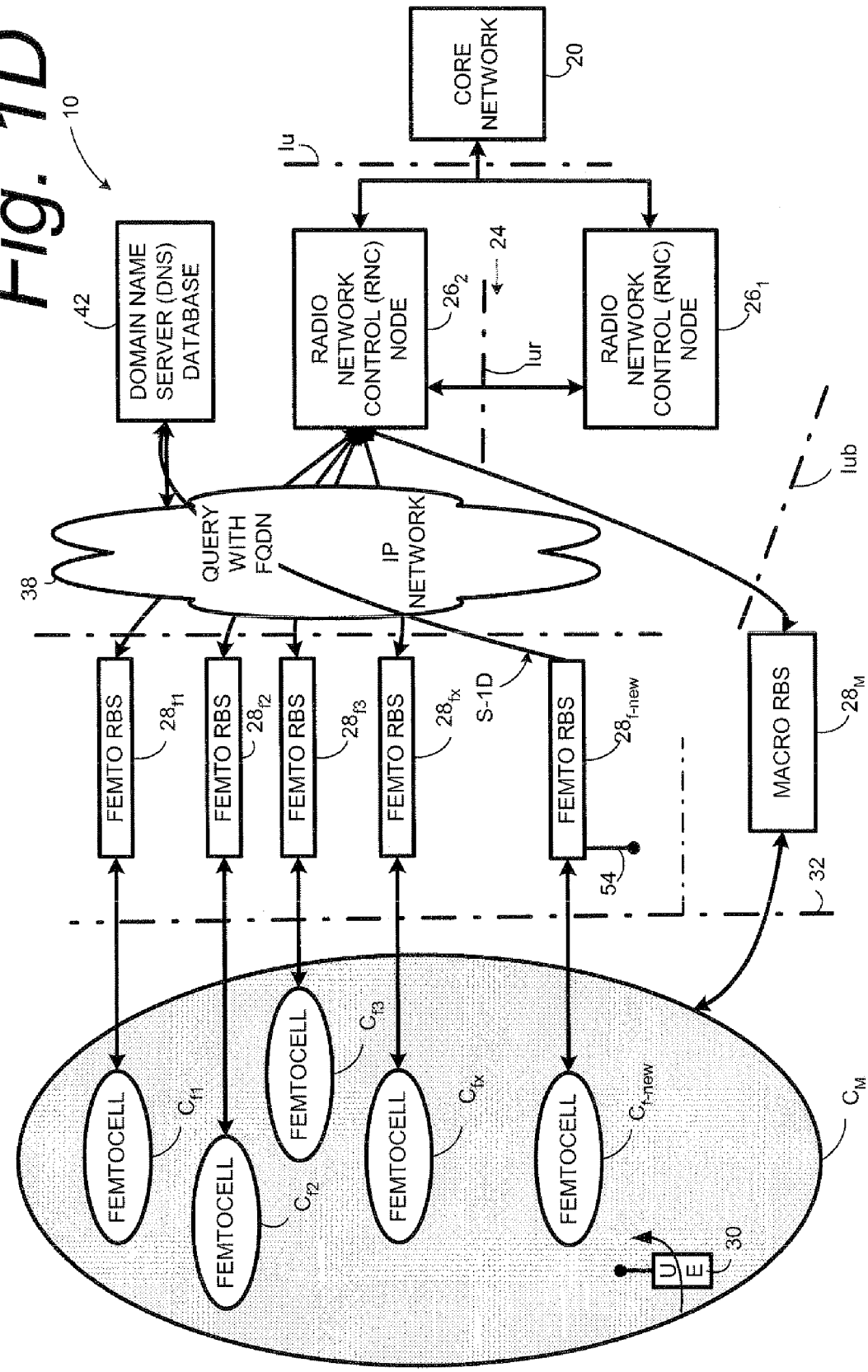

Once the fully qualified domain name (FQDN) has been constructed (in a manner such as that described subsequently), as shown in FIG. 1D the femto radio base station uses the fully qualified domain name (FQDN) to query domain name system (DNS) database 42. In one example implementation of femto radio base station $28_{f\text{-}new}$, the fully qualified domain name (FQDN) is conveyed as a node address inquiry to IP interface unit 50, as depicted by step or event S-1D in FIG. 1D. IP interface unit 50 serves for sending the node address inquiry including the fully qualified domain name (FQDN) to domain name system (DNS) database 42. In order to access domain name system (DNS) database 42, femto radio base station $28_{f\text{-}new}$ knows in advance the network address of domain name system (DNS) database 42, e.g., the network address of domain name system (DNS) database 42 is prestored or previously downloaded to IP interface unit 50 using for example a Dynamic Host Configuration Protocol (DHCP) server. As an example, FIG. 2 shows femto radio base station $28_f$ as having a memory 94 (preferably non-volatile) for storage of the IP address of domain name system (DNS) database 42.

FIG. 1E depicts, as step or event S-1E, the domain name system (DNS) database 42 receiving the node address inquiry (query) from femto radio base station $28_{f\text{-}new}$ and performing a search to match an IP address for an appropriate or correct radio network controller node with the FQDN of the query. As shown in FIG. 4, in one example configuration of domain name system (DNS) database 42, an IP address for a radio network controller node can possibly be associated with several queries, e.g., with several fully qualified domain names (FQDNs).

FIG. 1E also depicts the domain name system (DNS) database 42 returning a response to femto radio base station $28_{f\text{-}new}$ in the form of the IP address for the appropriate or correct radio network controller node which matches or suitably responds to the FQDN of the query. The IP interface unit 50 of femto radio base station $28_{f\text{-}new}$ serves for receiving the response to the query (the internet protocol (IP) address of the appropriate/correct radio network controller node). The internet protocol (IP) address of the appropriate/correct radio network controller node can be stored in a memory or register, such as memory 96 as shown in FIG. 2.

Figure 1F:
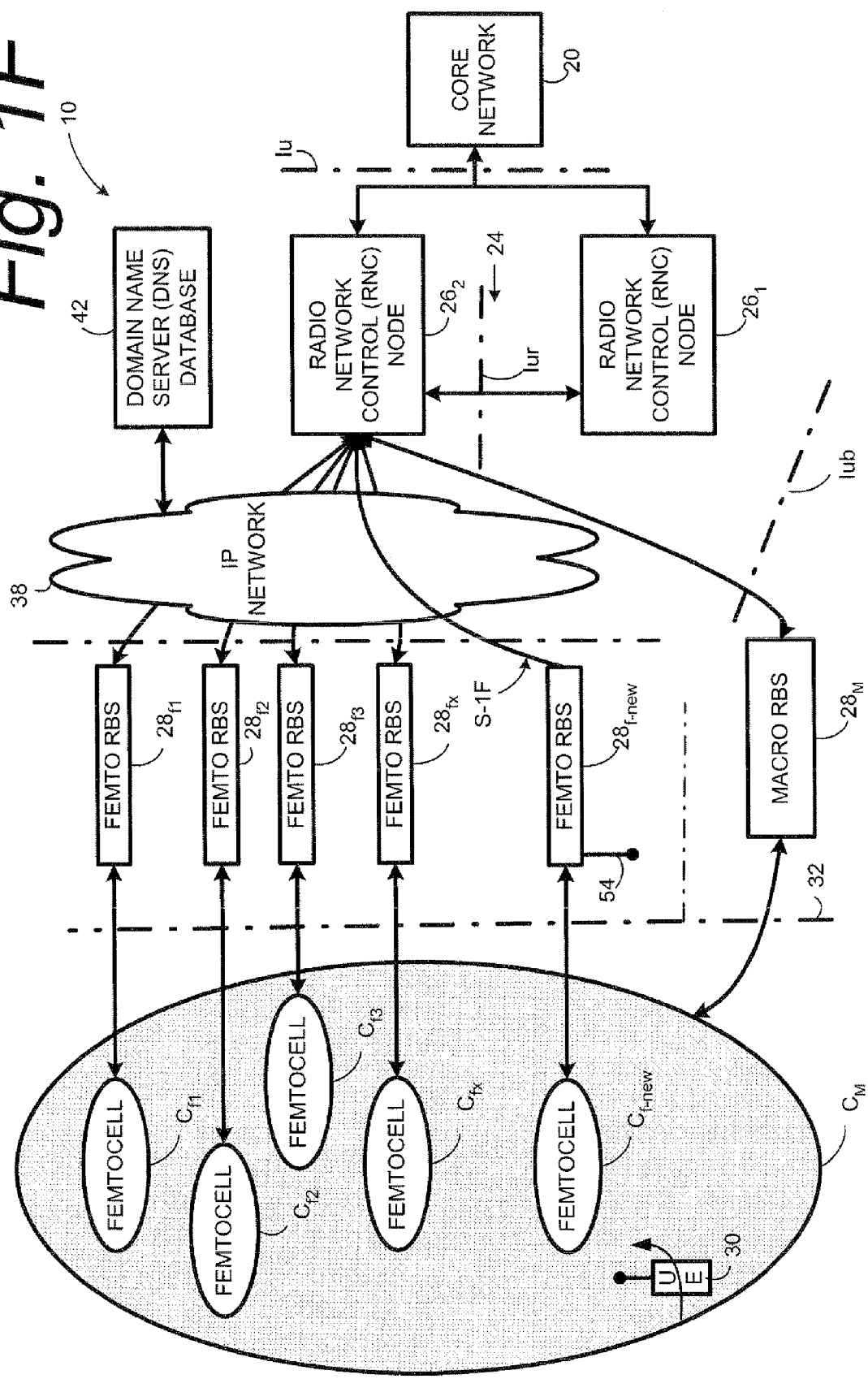

FIG. 1F depicts, as a subsequent stage of operation, the femto radio base station $28_{f\text{-}new}$, and particularly its IP interface unit 50, using the internet protocol (IP) address of the appropriate/correct radio network controller node (obtained in the manner described above with reference to FIG. 1A-FIG. 1E) to connect to the appropriate/correct radio network controller node for use by the femto radio base station as an active radio network control node for the femto radio base station. In the particular situation shown in FIG. 1F, IP interface unit 50 connects over IP network 38 to second radio network controller node $26_2$ which, in view of the network topology, is the correct/preferred radio network control node for femto radio base station $28_{f\text{-}new}$. Connection to radio network controller node $26_2$ over IP network 38 is depicted by step or event S-1F in FIG. 1F.

Thus, in an example manner illustrated above, the FQDN developed by FQDN formation unit 58 is used to query domain name system (DNS) database 42 to find the IP-address for the correct RNC. This enables femto radio base station $28_{f-new}$ to initiate IP connectivity with the radio network controller node whose address is selected by domain name system (DNS) database 42.

Figure 6:
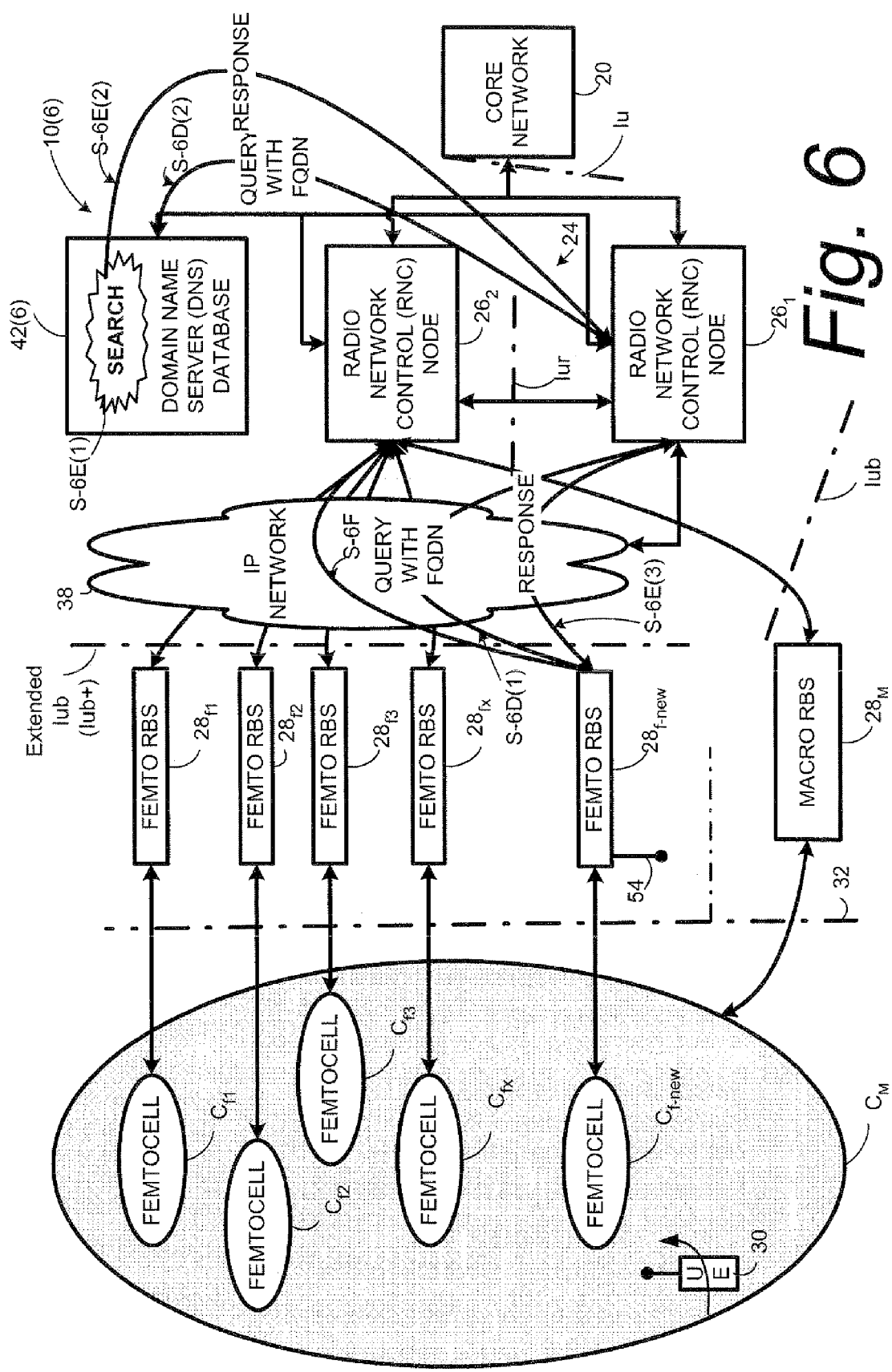
FIG. 6 is a diagrammatic view of another example embodiment of a telecommunications system including a radio access network, showing selected sequential stages of an operation of connecting a femto radio base station to an appropriate radio network control node according to another example mode of operation.

In the embodiment and mode of FIG. 1A-FIG. 1F, the FQDN developed by FQDN formation unit 58 is used to query domain name system (DNS) database 42 directly to find the IP-address for the correct RNC. FIG. 6 shows another embodiment and mode in which the FQDN developed by FQDN formation unit 58 is sent as a node address inquiry to a radio network controller node, and in which the radio network controller node then consults a database such as domain name server (DNS) database 42(6). In the FIG. 6 embodiment, the interface 50 of femto radio base station $28_f$ connects to communications network 38 over an interface known as the "extended Iub" interface (the "Iub+"interface). The extended Iub+ interface is preferably formed by an internet protocol (IP) connection over the IP network 38. In some implementations, the Iub+ interface resembles the Iub interface, but is modified for conveying additional information. Operation of the FIG. 6 embodiment and mode begins in a manner essentially the same as depicted by FIG. 1A-FIG. 1C of the embodiment and mode of FIG. 1A-FIG. 1F. However, in contrast to the earlier example embodiment, for the FIG. 6 embodiment and mode, step S-6D(1) shows IP interface unit 50 of the femto radio base station $28_f$ sending a query including the fully qualified domain name (FQDN) to radio network controller node $26_1$. The radio network controller node $26_1$, can be a default RNC node whose network address is known in advance by (e.g., preconfigured in) femto radio base station $28_f$. Step S-6D(2) shows radio network controller node $26_1$, consulting domain name server (DNS) database 42(6), with the query including the fully qualified domain name (FQDN) developed by the femto radio base station $28_f$. In the particular example embodiment shown in FIG. 6, the domain name server (DNS) database 42(6) is situated at another node distinct from the node of radio network controller node $26_1$. However, in other embodiments the domain name server (DNS) database 42(6) may be co-located with the default radio network controller node $26_1$.

FIG. 6 further depicts, as step or event S-6E(1), the domain name system (DNS) database 42 receiving the query from radio network controller node $26_1$, and performing a search to match an IP address for an appropriate or correct radio network controller node with the FQDN of the query. FIG. 6 also depicts as step or event S-6E(2) the domain name system (DNS) database 42 returning a response to radio network controller node $26_1$ in the form of the IP address for the appropriate or correct radio network controller node which matches or suitably responds to the FQDN of the query. As step or event S-6E(3), the radio network controller node $26_1$ forwards the response from domain name server (DNS) database 42(6) to the IP interface unit 50 of femto radio base station $28_{f-new}$. Thus, IP interface unit 50 of femto radio base station $28_{f-new}$ serves for receiving the response to the query (the internet protocol (IP) address of the appropriate/correct radio network controller node). The internet protocol (IP) address of the appropriate/correct radio network controller node can be stored in a memory or register femto radio base station $28_f$, as previously explained. In the example embodiment and mode of FIG. 6, it turns out that radio network controller node $26_2$, rather than radio network controller node $26_1$, is the appropriate/correct radio network controller node for femto radio base station $28_f$.

Then, as a subsequent stage of operation depicted by step or event S-6F, the femto radio base station $28_{f-new}$, and particularly its IP interface unit 50, uses the internet protocol (IP) address of the appropriate/correct radio network controller node to connect to the appropriate/correct radio network controller node for use by the femto radio base station as the active radio network control node for the femto radio base station. In the particular situation shown in FIG. 1F, IP interface unit 50 connects over IP network 38 to second radio network controller node $26_2$ which, in view of the network topology, is the correct/preferred radio network control node for femto radio base station $28_{f-new}$. Connection to radio network controller node $26_2$ over IP network 38 is depicted by step or event S-6F in FIG. 6.

Thus, in the embodiment and mode of FIG. 6, the Iub+ interface between femto radio base station $28_f$ and its default radio network controller node $26_1$ resembles the Iub interface, but is modified for conveying additional information such as the query of step S-6C and the response of step S-6D(3), for example.

Figure 7:
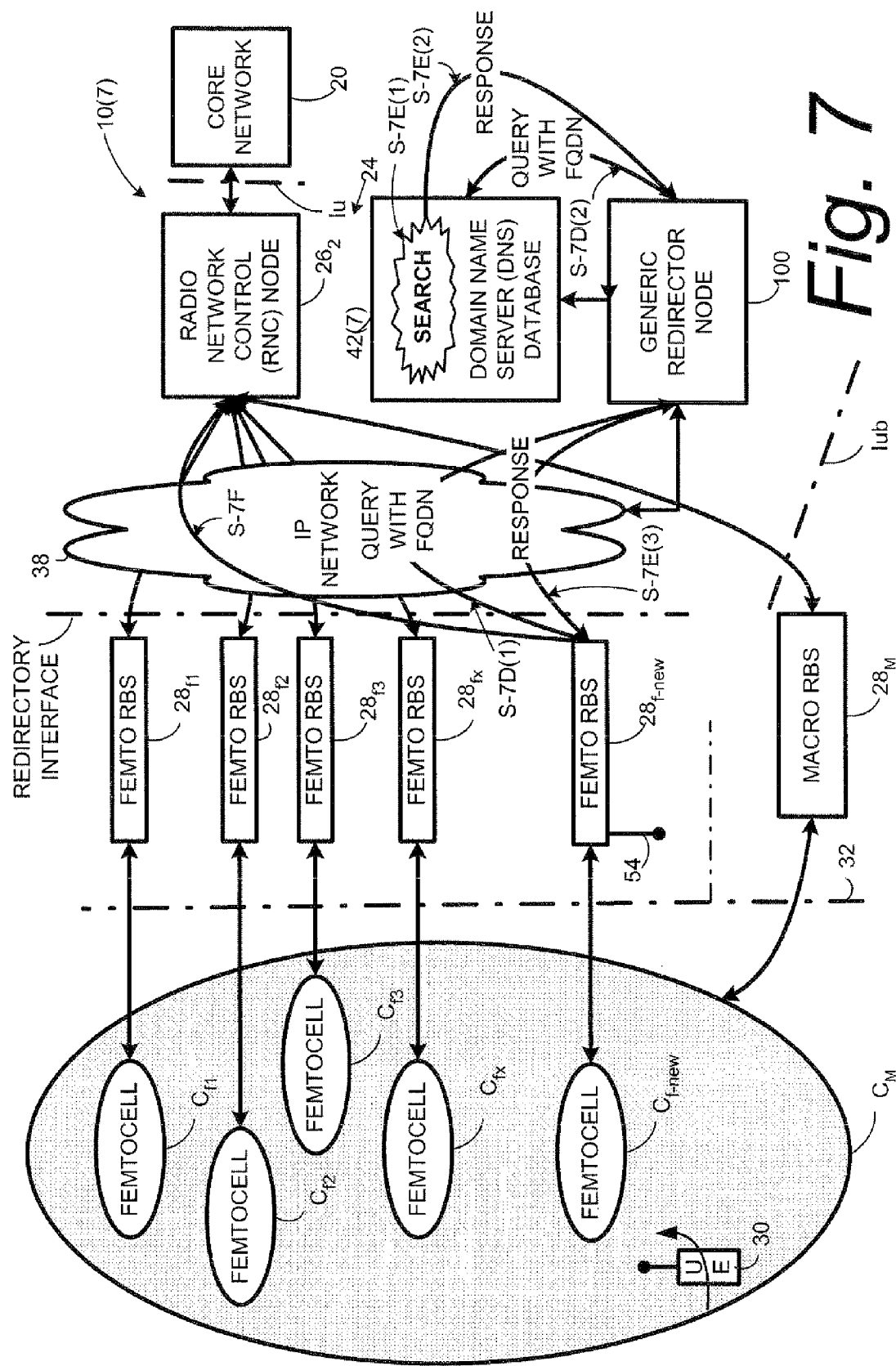
FIG. 7 is a diagrammatic view of yet another example embodiment of a telecommunications system including a radio access network, showing selected sequential stages of an operation of connecting a femto radio base station to an appropriate radio network control node according to yet another example mode of operation.

The embodiment and mode of FIG. 7 resembles that of FIG. 6, but includes a generic redirector node 100. The generic redirector node 100 performs similar steps and functions of the radio network controller node $26_1$ of FIG. 6, but uses a new or "redirectory" protocol over a "redirectory" interface instead of an Iub extended or Iub+ protocol. The "redirectory" protocol can be any new protocol configured to carry, e.g., the query information and the response to a generic node. FIG. 7 thus shows generic redirector node 100 as forwarding the query to domain name server (DNS) database 42(7) as step or event S-7D(2), receiving the response from domain name server (DNS) database 42(7) as step or event S-7E(2), and forwarding the response from domain name server (DNS) database 42(7) to femto radio base station $28_f$ as step or event S-7E(3). Then, as a subsequent stage of operation depicted by step or event S-7F, the femto radio base station $28_{f-new}$, and particularly its IP interface unit 50, uses the internet protocol (IP) address of the appropriate/correct radio network controller node (e.g., radio network controller node $26_2$ in the FIG. 7 example) to connect to the appropriate/correct radio network controller node for use by the femto radio base station as the active radio network control node for the femto radio base station.

In their respective FIG. 6 and FIG. 7 embodiments, the default radio network controller node $26_1$ and the generic redirector node 100 can contact a domain name server (DNS) database situated at another node as in the situations depicted in FIG. 6 and FIG. 7, respectively. Alternatively, the default radio network controller node $26_1$ and the generic redirector node 100 can themselves, in their respective embodiments, perform the function of the domain name server (DNS) database.

Further, it should be realized that the database which is consulted in any of the embodiments described herein need not necessarily be called or serve exclusively as a domain name server (DNS) database. Any other database having sufficient information to locate or determine an address of the correct or appropriate radio network controller node for a femto radio base station can instead be utilized.

It was mentioned above that the FQDN formation unit 58 constructs a fully qualified domain name (FQDN) at least partially based on system information. The fully qualified domain name (FQDN) is said to be at least partially based on the system information in the sense that, e.g., the fully qualified domain name (FQDN) may also be based on preconfigured information in the femto radio base station to identify the operator. The preconfigured information could be, for example, a string like "operator.com". This particular identifier is referenced in FQDN examples below as "pre-conf-operator-id". In some other cases, the femto radio base station could instead use the string ".pub.3gppnetwork.org" as the preconfigured identifier.

As explained below, the fully qualified domain name (FQDN), which is at least partially formed using at least part of the broadcast system information, can be formed or generated in various and different ways. In one example implementation, one way to build the fully qualified domain name (FQDN) to use all the three identifiers: PLMN-ID, LAC and Cell Identity. As another example, the fully qualified domain name (FQDN) can comprise a combination of portions of two or more of (1) PLMN-ID; (2) Location Area Code (LAC); and (3) Cell Identity (CI), such combination possibly being a concatenation of portions of two or more of (1) PLMN-ID; (2) Location Area Code (LAC); and (3) Cell Identity (CI).

Thus, essentially any combination of PLMN-ID, LAC, and CI can be used to construct the FQDN. Example combinations are listed below (it being remembered that preconfigured information is represented by "pre-conf-operator-id'").
PLMN-ID, LAC and Cell-identity (CI)
PLMN-ID and LAC
PLMN-ID and Cell Identity
pre-conf-operator-id and LAC only (in some cases)
pre-conf-operator-id and Cell Identity only (in some cases)

For an example scenario, consider a situation in which the UTRAN environment is described by the following information:
The preconfigured information for the femto radio base station, i.e., pre-conf-operator-id set to "operator.com"
PLMN-ID is 012-123 (i.e. Mobile Country Code, MCC, is 012 and Mobile Network Code, MNC, is 123)
LAC has value 34567
CI has value of H'123 4567 (This means that the RNC identifier part of the CI is H'123 (i.e. 291 decimal) and the 3G cell identity part is H'4567 (i.e. 17767 decimal))

In the scenario described immediately above, the following is a list of non-limiting examples of fully qualified domain names (FQDNs) that could be formed or generated by FQDN formation unit 58 for the scenario:
pre-conf-operator-id and RNC part of Cell Identity only, e.g., "rnc291.operator.com"
pre-conf-operator-id and LAC only (in some cases), e.g., "lac34567.operator.com"
PLMN-ID and LAC, e.g., "lac34567.mnc123.mcc012.pub.3gppnetwork.org"

In one example mode of operation, the femto operator can select one or more of the different alternative ways to construct the FQDN. The domain name system (DNS) database 42 should be programmed or updated to reflect relevant information (IP address and FQDN matches or pairings for all radio network controller nodes for which domain name system (DNS) database 42 is responsible.

If the femto radio base station is not in WCDMA coverage, in one example embodiment the femto radio base station can connect to domain name system (DNS) database 42 only using the pre-conf-operator-id. Such a femto radio base station could connect to any radio network controller node, e.g., a default or central RNC, since in such case there is no need to provide neighboring cell lists as handover and roaming to the Macro cells is not possible without loosing coverage.

Figure 8:
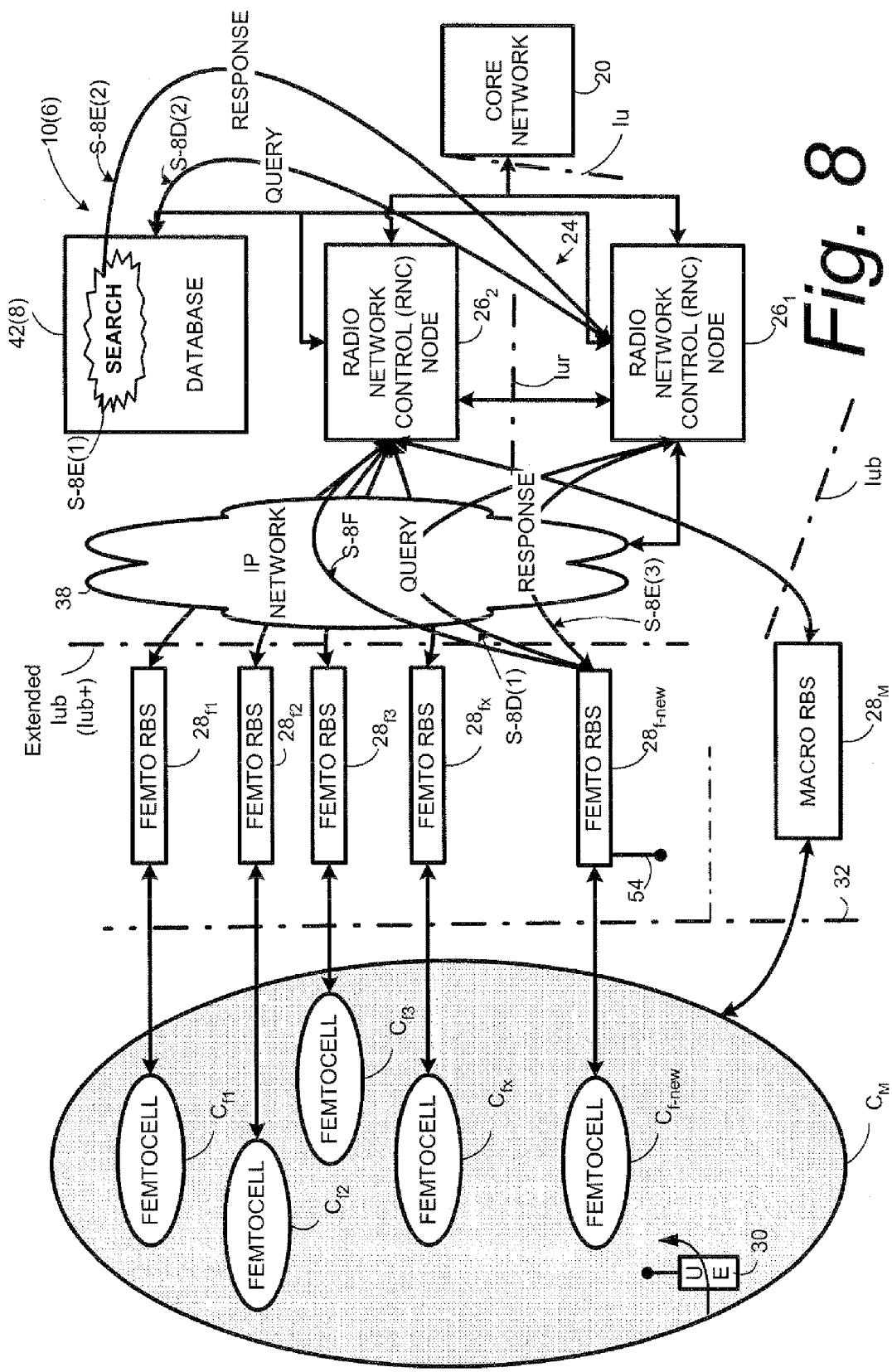
FIG. 8 is a diagrammatic view of yet another example embodiment of a telecommunications system including a radio access network, showing selected sequential stages of an operation of connecting a femto radio base station to an appropriate radio network control node according to yet another example mode of operation.
Figure 9:
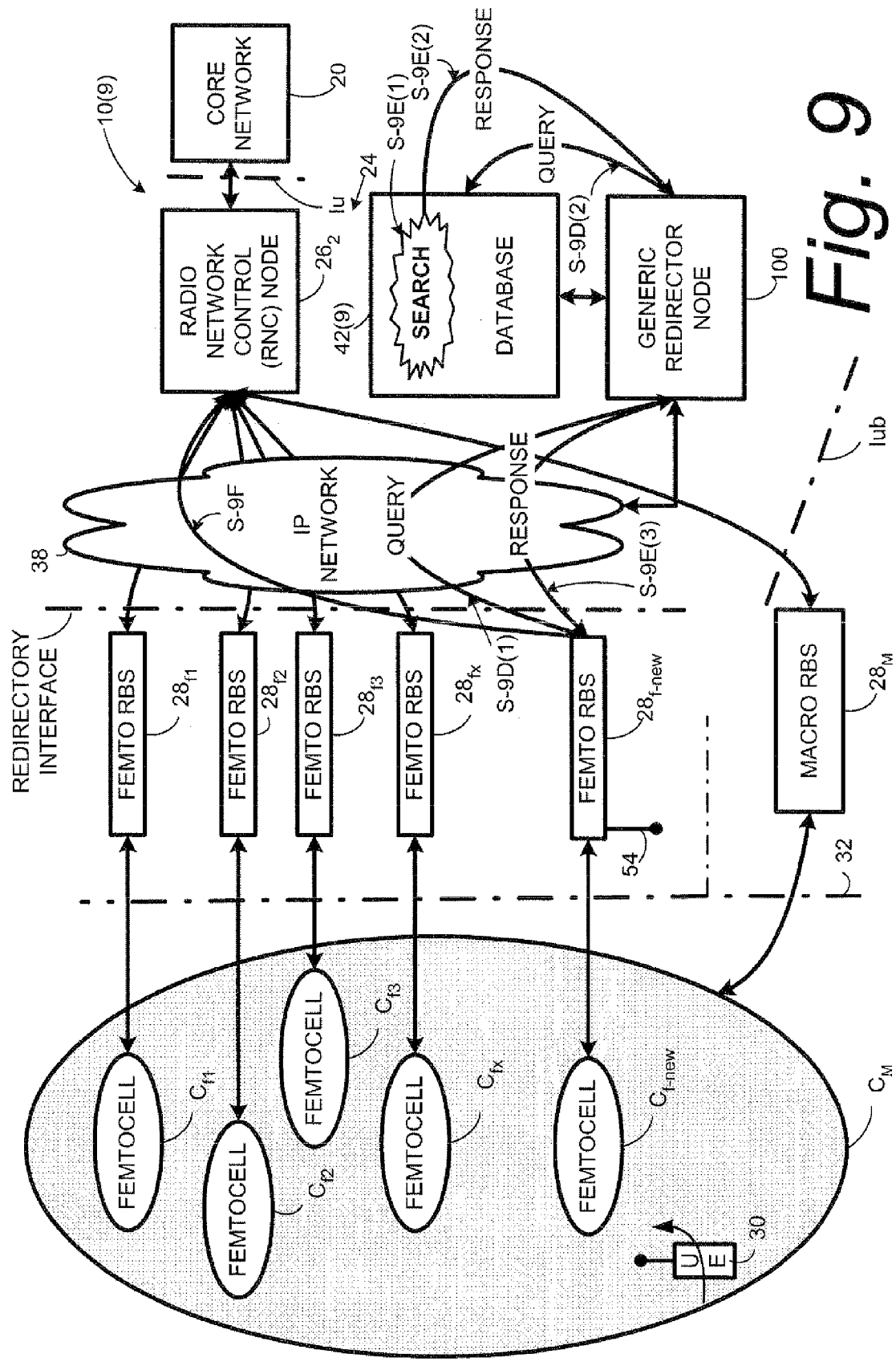
FIG. 9 is a diagrammatic view of yet another example embodiment of a telecommunications system including a radio access network, showing selected sequential stages of an operation of connecting a femto radio base station to an appropriate radio network control node according to yet another example mode of operation.

Moreover, in some embodiments and modes the node address inquiry can take a form different from a fully qualified domain name (FQDN). For example, in the example embodiments and modes of FIG. 8 and FIG. 9 the node address inquiry takes the form of a node address request message which (in FIG. 8) is sent to radio network controller node $26_1$ or which (in FIG. 9) is sent to generic redirector node. The example steps or events of FIG. 8 are analogous to those of FIG. 6, it being understood that in FIG. 8 the node address inquiry takes the form of a node address message rather than a fully qualified domain name (FQDN) and that the database 42(8) need not necessarily be a domain name server (DNS) database. Similarly, the example steps or events of FIG. 9 are analogous to those of FIG. 7, it also being understood that in FIG. 9 the node address inquiry takes the form of a node address message rather than a fully qualified domain name (FQDN) and that the database 42(9) need not necessarily be a domain name server (DNS) database.

The node address request message can comprise one or both of the at least part of the system information and an identifier for the femto radio base station for obtaining from the database the internet protocol (IP) address of the appropriate radio network controller node. In differing implementations, the identifier for the femto radio base station used in the node address request message can comprise at least one of a hardware identifier for the femto radio base station, a serial number for the femto radio base station, and an owner/operator number for the femto radio base station. The database (e.g., database 42(8) or database 42(9)) can use one or both of the system information and the identifier to determine an appropriate radio network controller node for the femto radio base station which bears the identifier and which provides the system information.

Regardless of what form the node address inquiry may take (whether, e.g., FQDN or node address request message), whatever radio network controller node becomes the active radio network controller node for femto radio base station $28_{f-new}$ should also be able to redirect the Femto RBS to another RNC when circumstances so necessitate. Such redirection can involve further consultation of the database 42. This decision could be (for example) based on the traffic amount and type created via the femto radio base station.

As indicated above, upon activation and start-up femto radio base station $28_{f-new}$ is essentially oblivious as to its location in radio access network. Therefore, the purpose in femto radio base station $28_{f-new}$ constructing a node address inquiry (e.g., a fully qualified domain name (FQDN) or a node address request message) and performing a query of a suitable database 42 is so that the femto radio base station $28_{f-new}$ can learn the address of an appropriate or correct radio network controller node to which femto radio base station can connect for use as an active radio network controller node.

Thus, as explained above, a femto radio base station can be moved by the end users and yet the femto radio base station will nevertheless connect to the correct RNC using the foregoing technology.

The foregoing principle/method can also be applied for radio technologies other than WCDMA, which is illustrated only as an example. Other suitable technologies include but are not limited to GSM, CDMA, WiMAX etc. The technology has particular relevance of the aforementioned and conveniently described system and scenarios, but could also be applied in other cases and for other networks.

Although various embodiments have been shown and described in detail, the claims are not limited to any particular embodiment or example. None of the above description should be read as implying that any particular element, step, range, or function is essential. The invention is not to be limited to the disclosed embodiment, but on the contrary, is intended to cover various modifications and equivalent arrangements.

What is claimed is:

1. A method of operating a radio access network comprising:
preparing, at a femto radio base station, a node address inquiry for obtaining from a database an internet protocol (IP) address of a controller node for connectivity to the femto radio base station, the controller node having an established communication path to a macro base station node that controls a macro cell of the radio access network, the macro cell overlaying the femto radio base station;
using the internet protocol (IP) address to connect the femto radio base station to the controller node as an active controller node for the femto radio base station.

2. The method of claim 1, further comprising including in the node address inquiry an identifier of the femto radio base station.

3. The method of claim 2, wherein the identifier for the femto radio base station comprises at least one of a hardware identifier for the femto radio base station, a serial number for the femto radio base station, and an owner/operator number for the femto radio base station.

4. The method of claim 1, further comprising acquiring, at the femto radio base station and over a radio interface, system information broadcast in a radio access network; and using at least part of the system information for preparing the node address inquiry.

5. The method of claim 4, further comprising using a node-resident receiver of the femto radio base station for acquiring the system information broadcast in a radio access network and over the radio interface from a node which broadcasts the system information.

6. The method of claim 4, wherein the system information comprises at least one of (1) Public Land Mobile Network Identifier (PLMN-ID); (2) Location Area Code (LAC); and (3) Cell Identity (CI).

7. The method of claim 4, further comprising:
using the at least part of the system information for constructing a fully qualified domain name (FQDN); and
using the fully qualified domain name (FQDN) to query a domain name system (DNS) database for obtaining the internet protocol (IP) address of the controller node for connectivity to the femto radio base station.

8. The method of claim 7, wherein the fully qualified domain name (FQDN) comprises a combination of portions of two or more of (1) Public Land Mobile Network Identifier (PLMN-ID); (2) Location Area Code (LAC); and (3) Cell Identity (CI).

9. The method of claim 7, wherein the fully qualified domain name (FQDN) comprises a concatenation of portions of two or more of (1) Public Land Mobile Network Identifier (PLMN-ID); (2) Location Area Code (LAC); and (3) Cell Identity (CI).

10. The method of claim 7, further comprising using the at least part of the system information and preconfiguration information for constructing the fully qualified domain name (FQDN).

11. The method of claim 7, further comprising the femto radio base station sending a query including the fully qualified domain name (FQDN) directly to the domain name system (DNS) database for obtaining the internet protocol (IP) address of the controller node.

12. The method of claim 4, further comprising:
the femto radio base station using the at least part of the system information for preparing a node address request message;
the femto radio base station sending the node address request message to a default controller node;
the default controller node forwarding the at least part of the system information to the database for obtaining the internet protocol (IP) address of the controller node that is the active controller node.

13. The method of claim 4, further comprising:
the femto radio base station using the at least part of the system information for preparing a node address request message;
the femto radio base station sending the node address request message to a generic redirector node, and the generic redirector node forwarding the at least part of the system information to the database for obtaining the internet protocol (IP) address of the controller node.

14. The method of claim 4, further comprising using the at least part of the system information and an identifier for the femto radio base station for obtaining from the database the internet protocol (IP) address of the controller node for connectivity to the femto radio base station.

15. The method of claim 14, wherein the identifier for the femto radio base station comprises at least one of a hardware identifier for the femto radio base station, a serial number for the femto radio base station, and an owner/operator number for the femto radio base station.

16. A femto radio base station comprising:
a resident radio receiver for receiving system information broadcast in a radio access network over an air interface from a node which broadcasts the system information;
means for using at least part of the system information for obtaining from a database an internet protocol (IP) address of a controller node for the femto radio base station, the controller node having an established communication path to a macro base station node that controls a macro cell of the radio access network, the macro cell overlaying the femto radio base station.

17. The apparatus of claim 16, wherein the system information comprises at least one of (1) Public Land Mobile Network Identifier (PLMN-ID); (2) Location Area Code (LAC); and (3) Cell Identity (CI).

18. The apparatus of claim 17, wherein the means for using at least part of the system information uses the at least part of the system information for constructing a fully qualified domain name (FQDN) and further uses the fully qualified domain name (FQDN) to query a domain name system (DNS) database for obtaining the internet protocol (IP) address of the controller node.

19. The apparatus of claim 18, wherein the fully qualified domain name (FQDN) comprises a combination of portions of two or more of (1) Public Land Mobile Network Identifier (PLMN-ID); (2) Location Area Code (LAC); and (3) Cell Identity (CI).

20. The apparatus of claim 18, wherein the fully qualified domain name (FQDN) comprises a concatenation of portions of two or more of (1) Public Land Mobile Network Identifier (PLMN-ID); (2) Location Area Code (LAC); and (3) Cell Identity (CI).

21. The apparatus of claim 18, wherein the means for constructing the fully qualified domain name (FQDN) uses the at least part of the system information and preconfiguration information for constructing the fully qualified domain name (FQDN).

22. The apparatus of claim 18, wherein the means for using at least part of the system information comprises an Internet Protocol (IP) interface arranged for sending a query including the fully qualified domain name (FQDN) directly to the domain name system (DNS) database and for directly receiving from the domain name system (DNS) database a response in the form of the internet protocol (IP) address of the controller node.

23. The apparatus of claim 18, wherein the means for using at least part of the system information comprises an Internet Protocol (IP) interface arranged for sending a node address request message including the system information to a default controller node and for receiving from the default controller node the internet protocol (IP) address of the controller node that is the active controller node.

24. The apparatus of claim 18, wherein the means for using at least part of the system information comprises an Internet Protocol (IP) interface arranged for sending a node address request message including the system information to a generic redirector node and for receiving from the generic redirector node the internet protocol (IP) the internet protocol (IP) address of the controller node.

25. The apparatus of claim 18, wherein the means for using at least part of the system information uses the at least part of the system information and an identifier for the femto radio base station for preparing a node address request message configured to elicit from the database the internet protocol (IP) address of the controller node.

26. The apparatus of claim 25, wherein the means for using at least part of the system information is arranged for include as the identifier for the femto radio base station comprises at least one of a hardware identifier for the femto radio base station, a serial number for the femto radio base station, and an owner/operator number for the femto radio base station.

27. A radio access network comprising:
a database;
plural controller nodes;
at least one femto radio base station comprising:
 a resident radio receiver for receiving system information broadcast in the radio access network over an air interface from a node which broadcasts the system information;
 means for using at least part of the system information for constructing a node address inquiry which includes the system information;
 an Internet Protocol (IP) interface for sending the node address inquiry to the database, for receiving, as a response to the node address inquiry, an internet protocol (IP) address of an appropriate controller node of the plural controller nodes, and for using the address of the appropriate radio network controller node for connecting the femto radio base station to the appropriate controller node as an active control node for the at least one femto radio base station, the appropriate controller node having an established communication path to a macro base station node that controls a macro cell of the radio access network, the macro cell overlaying the femto radio base station.

28. The apparatus of claim 27, wherein the system information comprises at least one of (1) Public Land Mobile Network Identifier (PLMN-ID; (2) Location Area Code (LAC); and (3) Cell Identity (CI).

29. The apparatus of claim 27, wherein the means for using at least part of the system information uses the at least part of the system information for constructing node address inquiry in a form of a fully qualified domain name (FQDN) and further uses the fully qualified domain name (FQDN) to query a domain name system (DNS) database for obtaining the internet protocol (IP) address of the appropriate controller node.

30. The apparatus of claim 29, wherein the fully qualified domain name (FQDN) comprises a combination of portions of two or more of (1) Public Land Mobile Network Identifier (PLMN-ID); (2) Location Area Code (LAC); and (3) Cell Identity (CI).

31. The apparatus of claim 29, wherein the fully qualified domain name (FQDN) comprises a concatenation of portions of two or more of (1) Public Land Mobile Network Identifier (PLMN-ID); (2) Location Area Code (LAC); and (3) Cell Identity (CI).

32. The apparatus of claim 29, wherein the means for constructing the fully qualified domain name (FQDN) uses the at least part of the system information and preconfiguration information for constructing the fully qualified domain name (FQDN).

33. The method of claim 29, wherein the Internet Protocol (IP) interface is arranged for sending the query including the fully qualified domain name (FQDN) directly to the domain name system (DNS) database and for directly receiving from the domain name system (DNS) database a response in the form of the internet protocol (IP) address of the appropriate controller node.

34. The method of claim 27, wherein the means for using at least part of the system information comprises an Internet Protocol (IP) interface arranged for sending a node address inquiry in a form of a node address request message including the system information to a default controller node and for receiving from the default controller node the internet protocol (IP) address of the appropriate controller node that is the active controller node.

35. The method of claim 29, wherein the means for using at least part of the system information comprises an Internet Protocol (IP) interface arranged for sending a node address inquiry in a form of a node address request message including the system information to a generic redirector node and for receiving from the generic redirector node the internet protocol (IP) the internet protocol (IP) address of the appropriate controller node.

36. The apparatus of claim 27, wherein the means for using at least part of the system information uses the at least part of the system information and an identifier for the femto radio base station for preparing a node address request message configured to elicit from the database the internet protocol (IP) address of the appropriate controller node.

37. The apparatus of claim 36, wherein the means for using at least part of the system information is arranged for include as the identifier for the femto radio base station comprises at least one of a hardware identifier for the femto radio base station, a serial number for the femto radio base station, and an owner/operator number for the femto radio base station.

38. The method of claim 1, wherein the controller node is one of plural controller nodes comprising the radio access network and which serves both the femto radio base station and a macro cell.

39. The apparatus of claim 16, wherein the controller node is one of plural controller nodes comprising the radio access network and which serves both the femto radio base station and a macro cell.

40. The apparatus of claim 27, wherein the controller node is one of plural controller nodes comprising the radio access network and which serves both the femto radio base station and a macro cell.

* * * * *

UNITED STATES PATENT AND TRADEMARK OFFICE
CERTIFICATE OF CORRECTION

| | | |
|---|---|---|
| PATENT NO. | : 7,768,983 B2 | Page 1 of 1 |
| APPLICATION NO. | : 11/538084 | |
| DATED | : August 3, 2010 | |
| INVENTOR(S) | : Nylander et al. | |

It is certified that error appears in the above-identified patent and that said Letters Patent is hereby corrected as shown below:

On the Title Page, in Field (56), under "OTHER PUBLICATIONS", in Column 2, Line 1, delete "Fink" and insert -- Link --, therefor.

In Column 15, Line 21, delete ""pre-conf-operator-id"")." and insert -- "pre-conf-operator-id"): --, therefor.

In Column 19, Line 56, in Claim 28, delete "(PLMN-ID;" and insert -- (PLMN-ID); --, therefor.

Signed and Sealed this
Eighteenth Day of January, 2011

David J. Kappos
*Director of the United States Patent and Trademark Office*